US012621102B2

(12) United States Patent
Wang et al.

(10) Patent No.: US 12,621,102 B2
(45) Date of Patent: May 5, 2026

(54) UE-ASSISTED CHANNEL RECONSTRUCTION BASED ON PARTIAL SPATIAL SOUNDING

(71) Applicant: QUALCOMM Incorporated, San Diego, CA (US)

(72) Inventors: Runxin Wang, San Diego, CA (US); Muhammad Sayed Khairy Abdelghaffar, San Jose, CA (US); Yu Zhang, San Diego, CA (US); Krishna Kiran Mukkavilli, San Diego, CA (US); Tingfang Ji, San Diego, CA (US); Hwan Joon Kwon, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 363 days.

(21) Appl. No.: 18/038,947

(22) PCT Filed: Jan. 15, 2021

(86) PCT No.: PCT/CN2021/071994
§ 371 (c)(1),
(2) Date: May 25, 2023

(87) PCT Pub. No.: WO2022/151303
PCT Pub. Date: Jul. 21, 2022

(65) Prior Publication Data
US 2023/0421326 A1 Dec. 28, 2023

(51) Int. Cl.
*H04L 5/00* (2006.01)
*H04B 7/06* (2006.01)

(52) U.S. Cl.
CPC ......... *H04L 5/0051* (2013.01); *H04B 7/0628* (2013.01); *H04B 7/0691* (2013.01)

(58) Field of Classification Search
CPC ... H04L 5/0051; H04L 5/0048; H04L 5/0091; H04L 5/005; H04L 5/0053; H04B 7/0628; H04B 7/0691; H04B 7/0686; H04B 7/063
See application file for complete search history.

(56) References Cited

U.S. PATENT DOCUMENTS 10,873,481 B2 * 12/2020 Manolakos ........... H04L 5/0048
2018/0278316 A1 9/2018 Yang et al.
(Continued)

FOREIGN PATENT DOCUMENTS

CN 102299730 A 12/2011
CN 103856309 A 6/2014
(Continued)

OTHER PUBLICATIONS

Huawei., et al., "On the Enhancement of SRS Carrier Switching Capability", 3GPP TSG-RAN WG2 Meeting #109 electronic, R2-2001327, Feb. 24-Mar. 6, 2020, 8 Pages, The whole document.
(Continued)

*Primary Examiner* — Phong La
(74) *Attorney, Agent, or Firm* — ArentFox Schiff, LLP

(57) ABSTRACT

A user equipment may be configured to assist channel reconstruction using partial spatial sounding. In some aspects, the user equipment (UE) may transmit, to another device, correlation capability information indicating a sounding reference signal (SRS) grouping capability of the UE, and receive, from the other device, reference signal (RS) configuration information for configuring a sounding procedure to be performed by the UE. Further, the UE may transmit a reference signal to the other device over a reference antenna port of the UE to allow the other device to determine channel information for another antenna port of the UE, and receive data from the other device based on the channel information.

30 Claims, 11 Drawing Sheets

(56)  References Cited

U.S. PATENT DOCUMENTS

| 2019/0165971 | A1* | 5/2019 | Manolakos | ......... | H04L 25/0226 |
| 2019/0349066 | A1* | 11/2019 | Yang | .................... | H04B 7/0697 |
| 2021/0321379 | A1* | 10/2021 | Cirik | ................. | H04B 7/06968 |
| 2023/0008939 | A1* | 1/2023 | Gao | ...................... | H04W 72/12 |
| 2023/0163913 | A1* | 5/2023 | Manolakos | .......... | H04L 5/0094 |
| | | | | | 370/329 |
| 2023/0421326 | A1* | 12/2023 | Wang | .................... | H04L 5/0051 |

FOREIGN PATENT DOCUMENTS

| CN | 108111279 | A | * | 6/2018 | ........... | H04L 5/0005 |
| CN | 109802801 | A | * | 5/2019 | ........... | H04L 5/0091 |
| CN | 111294229 | A | * | 6/2020 | ........... | H04L 5/0092 |
| WO | WO-2019062681 | A1 | * | 4/2019 | ........... | H04L 5/0048 |
| WO | WO-2019135651 | A1 | * | 7/2019 | ........... | H04W 72/23 |
| WO | 2020147033 | A1 | | 7/2020 | | |
| WO | WO-2020209597 | A1 | * | 10/2020 | ......... | H04B 7/06966 |

OTHER PUBLICATIONS

Intel Corporation: "Downgrading Configuration of SRS for Antenna Switching", 3GPP TSG RAN WG2 #109e, R2-2001275, E-Meeting, Feb. 24-Mar. 6, 2020, pp. 1-6, The whole document.
International Search Report and Written Opinion—PCT/CN2021/071994—ISA/EPO—Oct. 19, 2021.

* cited by examiner

900

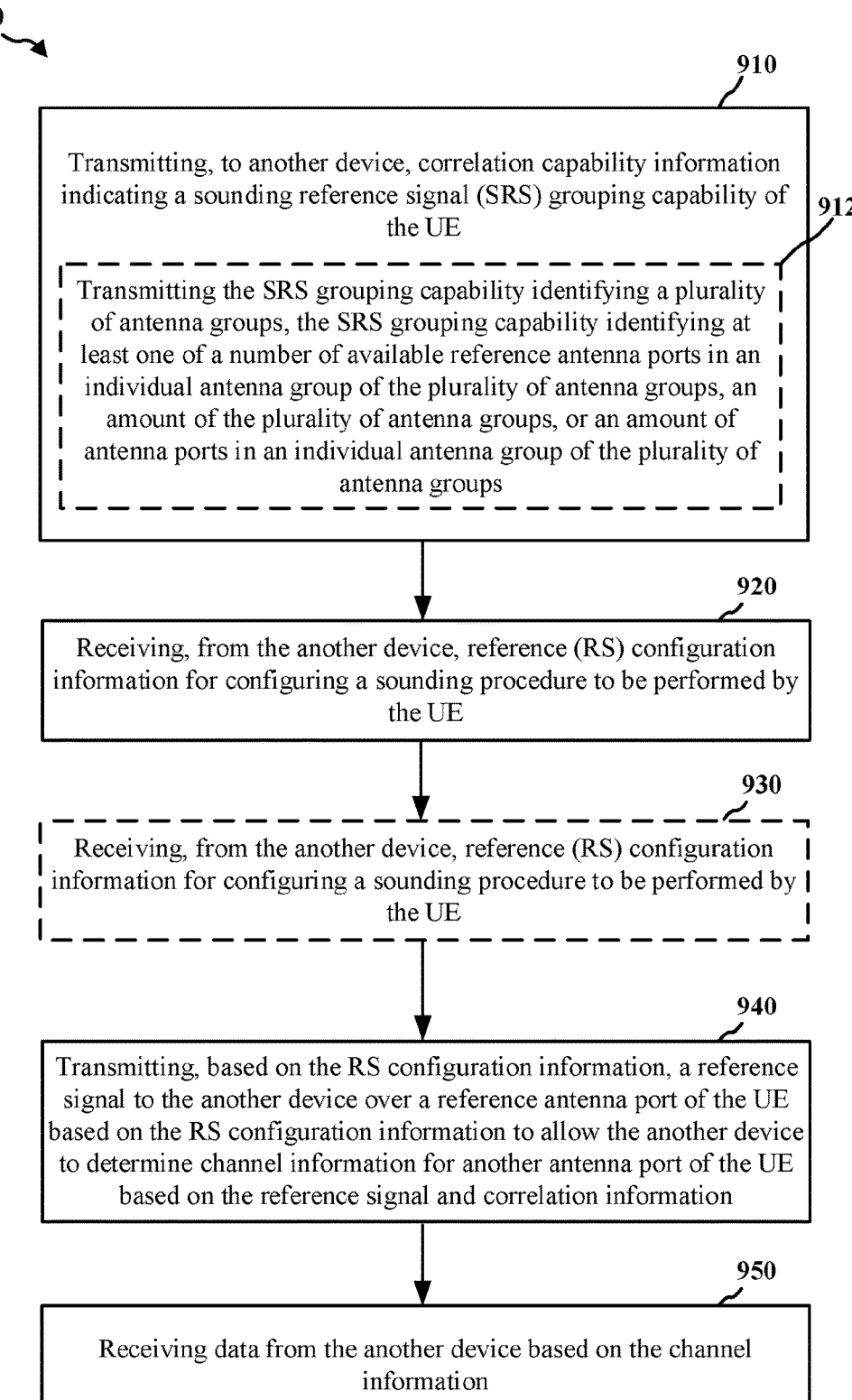

910

Transmitting, to another device, correlation capability information indicating a sounding reference signal (SRS) grouping capability of the UE

912

Transmitting the SRS grouping capability identifying a plurality of antenna groups, the SRS grouping capability identifying at least one of a number of available reference antenna ports in an individual antenna group of the plurality of antenna groups, an amount of the plurality of antenna groups, or an amount of antenna ports in an individual antenna group of the plurality of antenna groups

920

Receiving, from the another device, reference (RS) configuration information for configuring a sounding procedure to be performed by the UE

930

Receiving, from the another device, reference (RS) configuration information for configuring a sounding procedure to be performed by the UE

940

Transmitting, based on the RS configuration information, a reference signal to the another device over a reference antenna port of the UE based on the RS configuration information to allow the another device to determine channel information for another antenna port of the UE based on the reference signal and correlation information

950

Receiving data from the another device based on the channel information

FIG. 9

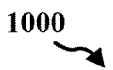

1000

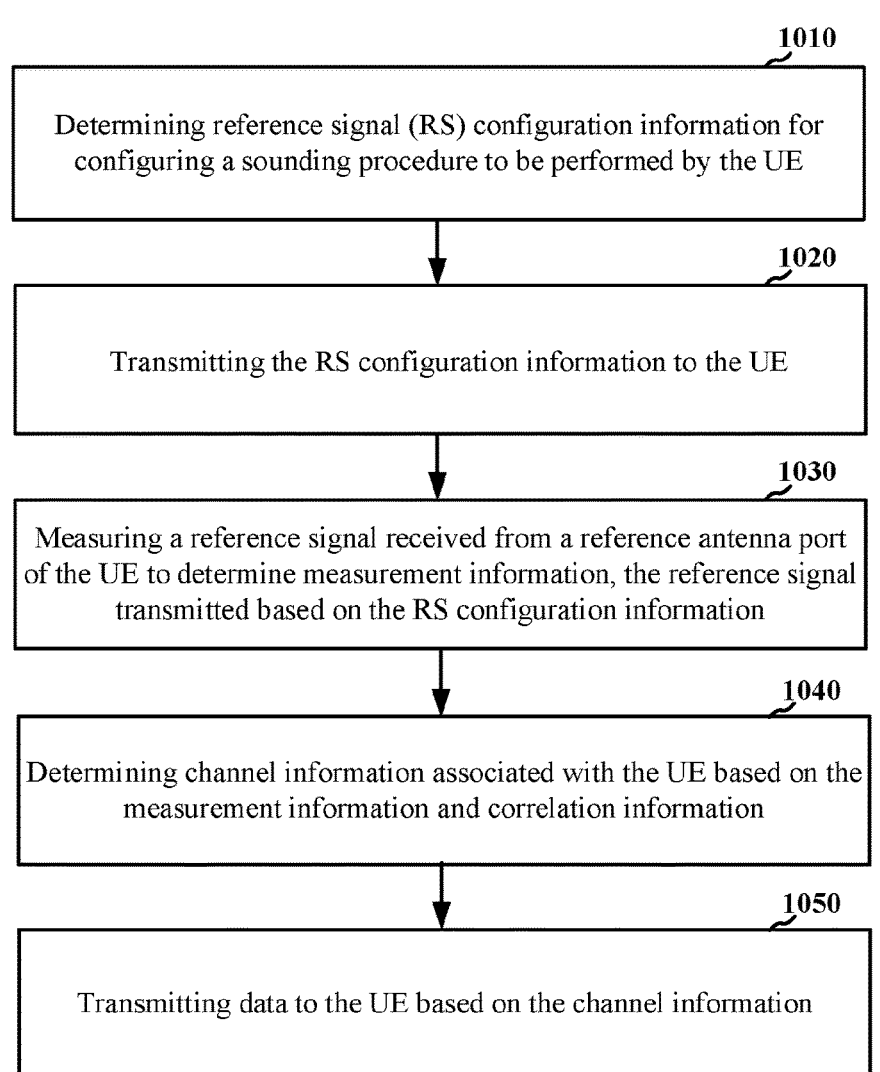

1010

Determining reference signal (RS) configuration information for configuring a sounding procedure to be performed by the UE

1020

Transmitting the RS configuration information to the UE

1030

Measuring a reference signal received from a reference antenna port of the UE to determine measurement information, the reference signal transmitted based on the RS configuration information

1040

Determining channel information associated with the UE based on the measurement information and correlation information

1050

Transmitting data to the UE based on the channel information

FIG. 10

UE-ASSISTED CHANNEL RECONSTRUCTION BASED ON PARTIAL SPATIAL SOUNDING

CROSS-REFERENCE TO RELATED APPLICATIONS

This application is a 35 U.S.C. § 371 National Phase Application of PCT Application No. PCT/CN2021/071994 filed Jan. 15, 2021, entitled "UE-ASSISTED CHANNEL RECONSTRUCTION BASED ON PARTIAL SPATIAL SOUNDING," which is assigned to the assignee hereof and hereby incorporated by reference herein.

BACKGROUND

Technical Field

The present disclosure relates generally to wireless communication, and more particularly, to channel reconstruction based on partial spatial sounding.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A first example implementation includes a method of wireless communication at a user equipment (UE) comprising transmitting, to another device, correlation capability information indicating a sounding reference signal (SRS) grouping capability of the UE, receiving, from the another device, reference signal (RS) configuration information for configuring a sounding procedure to be performed by the UE, and transmitting a reference signal to the another device over a reference antenna port of the UE based on the RS configuration information, the another device determining channel information for another antenna port of the UE based on the reference signal and correlation information.

The disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

A second example implementation includes a method of wireless communication at a device comprising receiving, from a user equipment, correlation capability information indicating a SRS grouping capability of the UE, determining RS configuration information for configuring a sounding procedure to be performed by the UE, transmitting the RS configuration information to the UE, receiving a reference signal from a reference antenna port of the UE based on the RS configuration information, and determining channel information associated with the UE based on the reference signal and correlation information.

The disclosure also provides an apparatus (e.g., a base station, a UE, etc.) including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 9 is a flowchart of an example method of partial spatial sounding, in accordance with some aspects of the present disclosure.

FIG. 10 is a flowchart of an example method of UE assisted channel reconstruction based on partial spatial sounding, in accordance with some aspects of the present disclosure.

DETAILED DESCRIPTION

Figure 1:
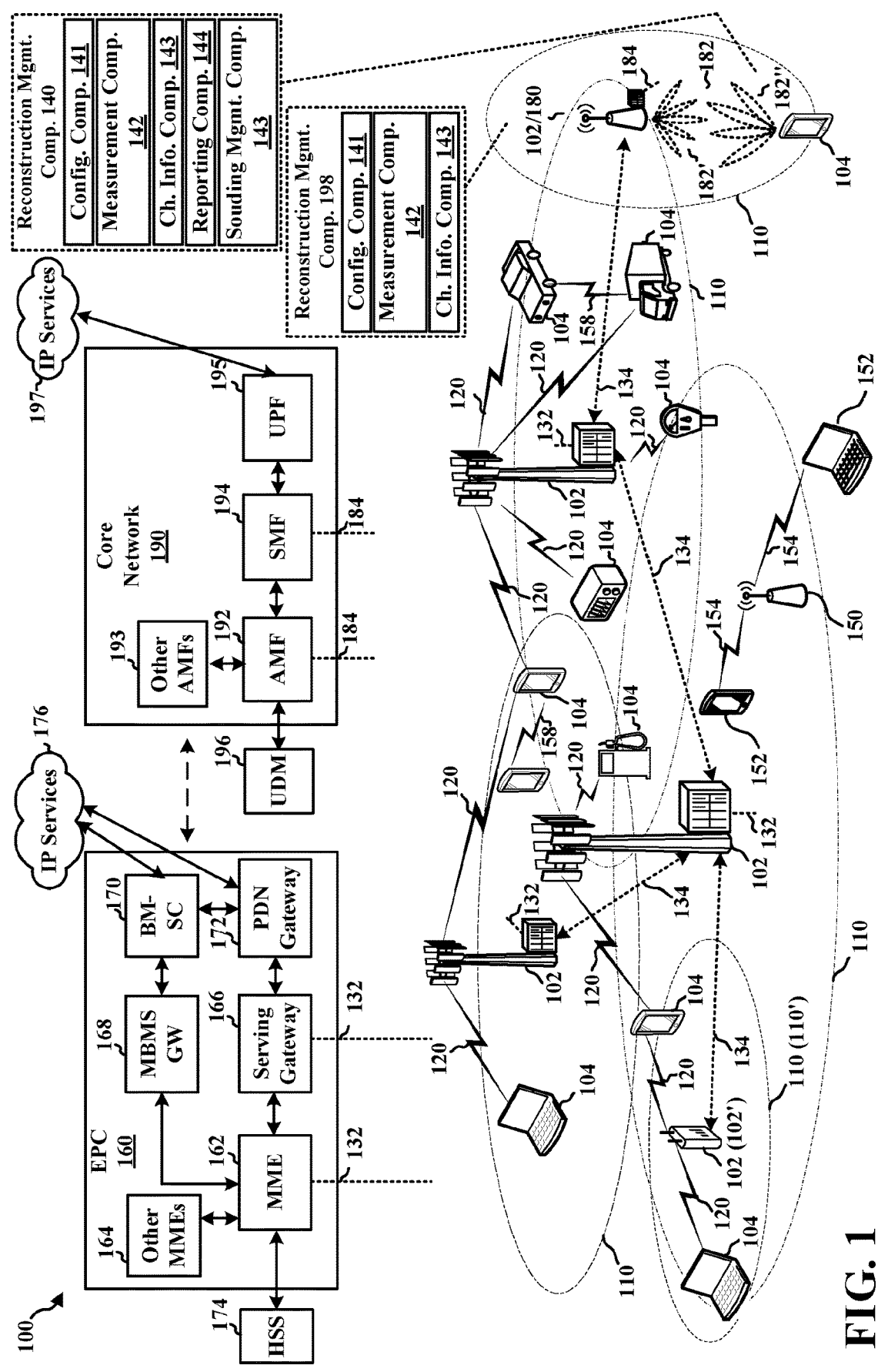
FIG. 1 is a diagram illustrating an example of a wireless communications system and an access network, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various implementations relate generally to a procedure for channel reconstruction based on partial spatial sounding. In some aspects, a UE may be configured to organize the antennas of the UE into a plurality of antenna groups based upon correlation characteristics, inform a partner device (e.g., a base station or another UE) of the correlation relationships between the antennas of the UE and/or the plurality of antenna groups, and perform a partial sounding operation using a subset of antennas of the UE. In response, the partner device may measure the reference signals received during the partial sounding operation, and perform channel reconstruction to determine a channel matrix based on the measurements and the correlation relationships. Accordingly, in some aspects, the time and power resources of a UE may be increased by increasing the amount of antennas used by the UE without burdening the UE with a costly and intensive commitment that every antenna of the UE need transmit a reference signal during a sounding operation.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In an aspect, a UE 104 may include a reconstruction management component 140 configured to manage channel reconstruction based on partial spatial sounding. The reconstruction management component 140 may include a configuration component 141 configured to generate configuration parameters that cause another device to perform a partial sounding process, a measurement component 142 configured to measure sounding signals received by the UE 104, a channel information component 143 configured to generate channel state information based on the measurements determined by the measurement component 142, a reporting component 144 configured to report correlation information defining correlation relationships between the antennas of the UE 104 to another device, and a sounding management component 145 configured to manage the transmission of sounding signals in accordance with a partial sounding process.

Further, in some aspects, a base station 102 may include a reconstruction management component 198 configured to manage channel reconstruction based on partial spatial sounding. The reconstruction management component 198 may include a configuration component 141 configured to generate configuration parameters that cause a UE 104 to perform a partial sounding process, a measurement component 142 configured to measure sounding signals received by the base station 104 from a UE 104, and a channel information component 143 configured to generate channel state information based on measurements determined by the measurement component 142.

As described in detail herein, the partial sounding process permits a UE to employ additional antenna resources while reducing, minimizing, or preventing a burdensome increase in time and/or frequency utilization during the performance of sounding procedures to capture and characterize potential channels between the UE and another device (e.g., a base station).

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (416 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a satellite phone, a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

Figures 2A, 2B, 2C, 2D:
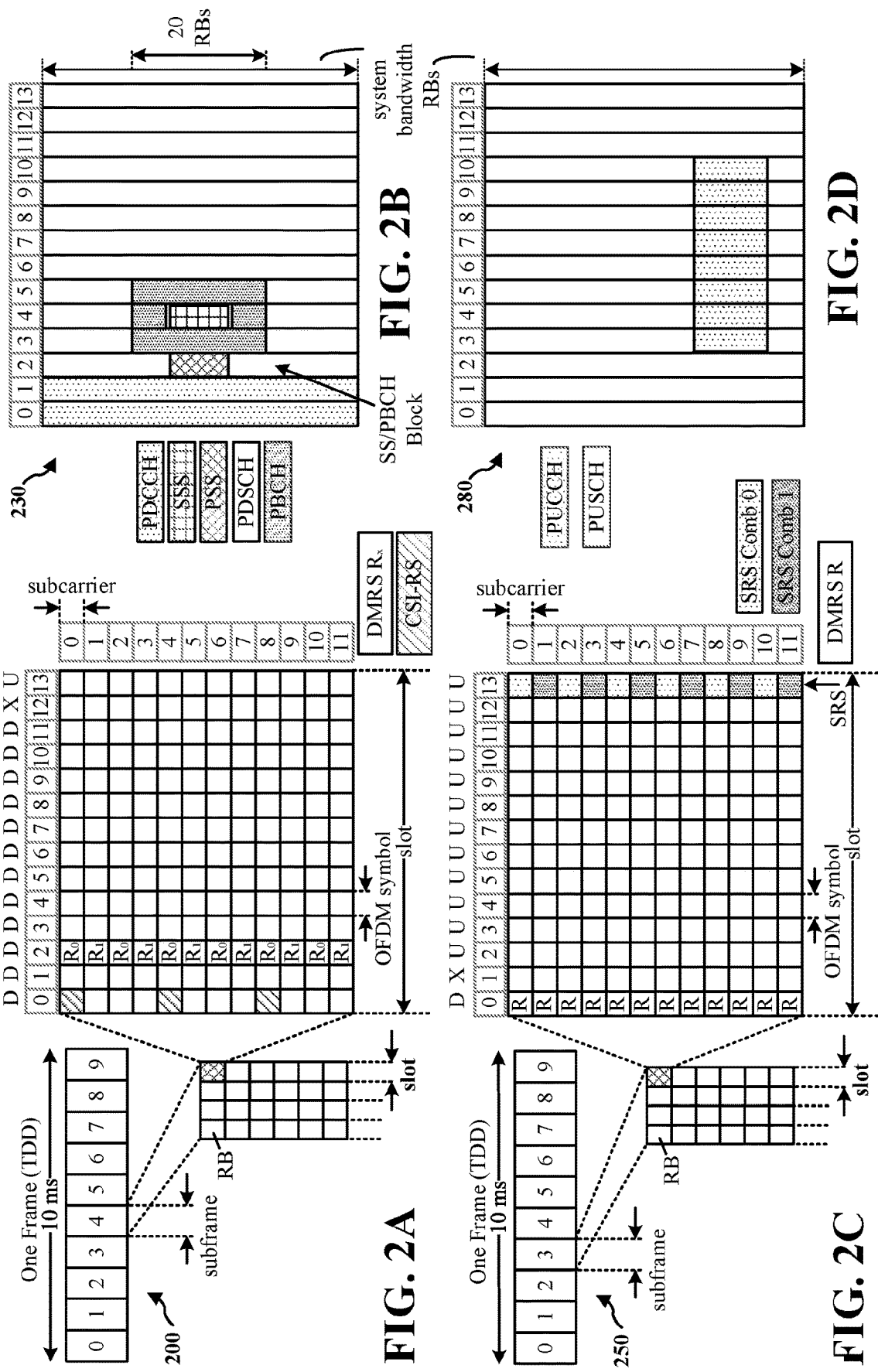
FIG. 2A is a diagram illustrating an example of a first 5G/NR frame, in accordance with some aspects of the present disclosure.
FIG. 2B is a diagram illustrating an example of DL channels within a 5G/NR subframe, in accordance with some aspects of the present disclosure.
FIG. 2C is a diagram illustrating an example of a second 5G/NR frame, in accordance with some aspects of the present disclosure.
FIG. 2D is a diagram illustrating an example of UL channels within a 5G/NR subframe, in accordance with some aspects of the present disclosure.

FIGS. 2A-2D include example diagrams 200, 230, 250, and 280 illustrating examples structures that may be used for wireless communication by the base station 102 and the UE 104, e.g., for 5G NR communication. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms).

Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. For slot configuration 0 and numerology II, there are 14 symbols/slot and 2μ slots/subframe. The subcarrier spacing and symbol length/duration are a function of the numerology. The subcarrier spacing may be equal to $2^{\mu}*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more CCE, each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
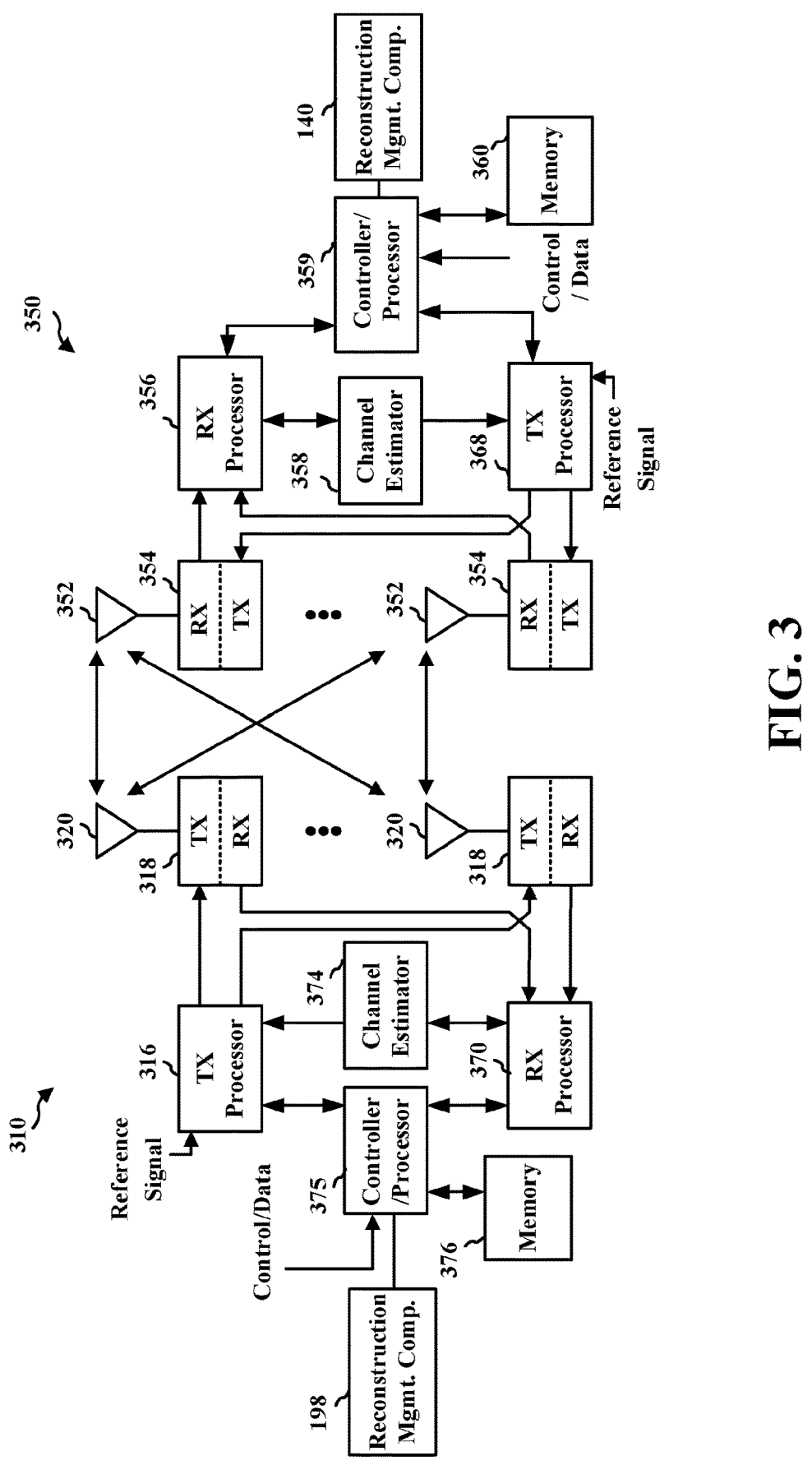
FIG. 3 is a diagram illustrating an example of a base station and a user equipment (UE) in an access network, in accordance with some aspects of the present disclosure.

FIG. 3 is a block diagram of a base station 102/180 (e.g., a satellite device) in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 102/180, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK or NACK protocol to support HARQ operations.

In the UE 104, at least one of the TX processor 368, the RX processor 356, and the controller/processor 359 may be configured to perform aspects in connection with the reconstruction management component 140 of FIG. 1.

In the base station 102/180, at least one of the TX processor 316, the RX processor 370, and the controller/processor 375 may be configured to perform aspects in connection with the reconstruction management component 198 of FIG. 1.

In order to improve device capabilities (e.g., increase communication quality and throughput), device manufactures may increase the amount of antennas of 5G NR devices (e.g., 5G NR UEs). However, employing conventional sounding techniques with such devices would require significant time and frequency resources to determine channel quality between the devices and base stations. The present disclosure provides techniques for channel reconstruction based on partial spatial sounding. As described in detail herein, a UE may be configured to reduce, minimize, or prevent a burdensome increase in time and/or frequency resource utilization during the performance of sounding procedures to capture and characterize potential channels between the UE and another device (e.g., a base station, or another UE).

In some aspects, a UE may be configured to organize the antennas of the UE into a plurality of antenna groups based upon correlation characteristics, inform a partner device (e.g., a base station or another UE) of the correlation relationships between the antennas of the UE and/or the plurality of antenna groups, and perform a partial sounding operation using a subset of antennas of the UE. In response, the partner device may measure the reference signals received during the partial sounding operation, and perform channel reconstruction to determine a channel matrix based on the measurements and the correlation relationships. Accordingly, in some aspects, the present techniques enable an efficient sounding procedure that does not burden UEs with a costly and intensive commitment that every antenna of the UE needs to transmit a reference signal during the sounding procedure.

Referring to FIGS. 4-10, in one non-limiting aspect, a system 400 is configured to improve time and frequency resource usage efficiency of sounding procedures in UEs.

Figure 4A:
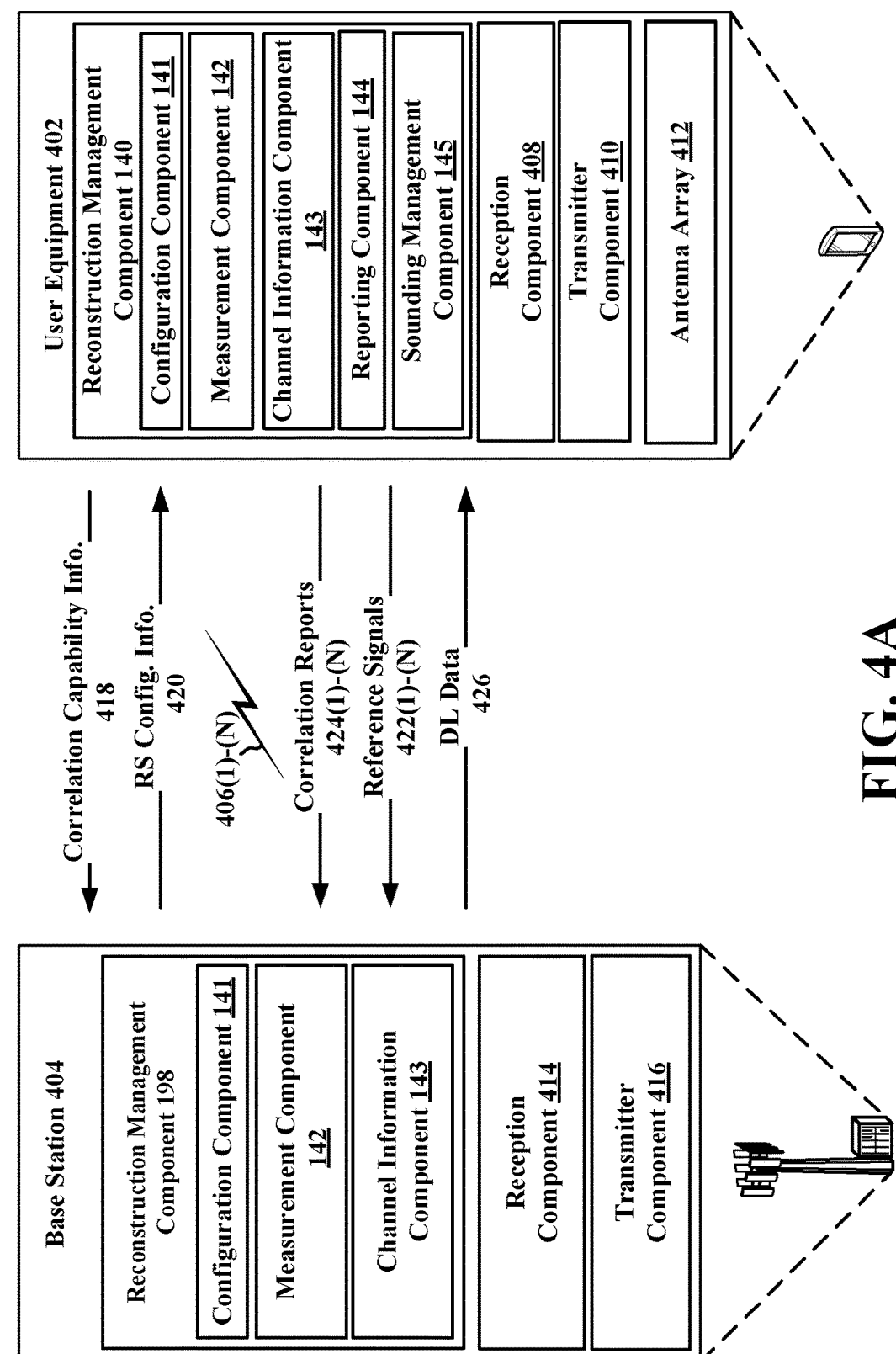
FIG. 4A is a diagram illustrating example communications and components of base stations and UEs, in accordance with some aspects of the present disclosure.
Figure 4B:
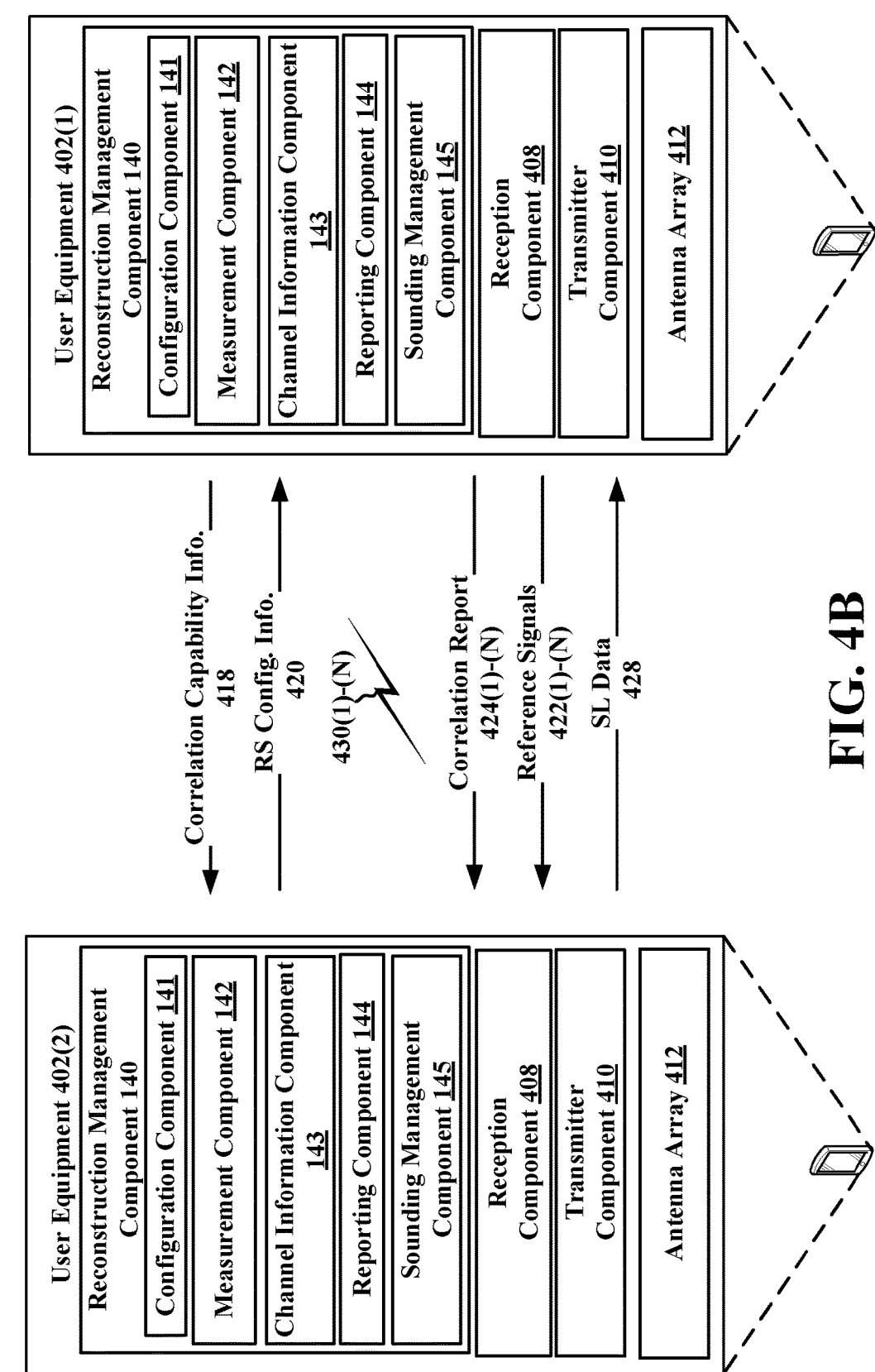
FIG. 4B is a diagram illustrating example communications and components of base stations and UEs, in accordance with some aspects of the present disclosure.

FIGS. 4A-4B is a diagram illustrating example communications and components of base stations and UEs.

As illustrated in FIG. 4A, the system 400 may include a UE 402 connected to a gNB 404. Further, the UE 402 and the gNB 404 may employ one or more channels 406(1)-(N) for uplink and downlink communications between the UE 402 and the gNB 404. Additionally, in some aspects, the UE 402 may be an example of a UE 104, and the gNB 404 may be an example of a base station 102.

As described above with respect to FIG. 1, the UE 402 may include the reconstruction management component 140 configured to manage assist channel reconstruction using partial spatial sounding. The reconstruction management component 140 may include the configuration component 141, the measurement component 142, the channel information component 143, the reporting component 144, and the sounding management component 145. In addition, the UE 402 may include a reception component 408 and a transmitter component 410. The reception component 408 may include, for example, a radio frequency (RF) receiver for receiving the signals described herein. The transmitter component 410 may include, for example, an RF transmitter for transmitting the signals described herein. In an aspect, the reception component 408 and the transmitter component 410 may be co-located in a transceiver. Further, the reception component 408 and the transmitter component 410 may be coupled with an antenna array 412 including a plurality of antennas for receiving or transmitting wireless signals.

As described above with respect to FIG. 1, the gNB 404 may include the reconstruction management component 198 configured to manage channel reconstruction based on partial spatial sounding. The reconstruction management component 198 may include the configuration component 141, the measurement component 142, and the channel information component 143. In addition, the gNB 404 may include a reception component 414 and a transmitter component 416. The reception component 414 may include, for example, a radio frequency (RF) receiver for receiving the signals described herein. The transmitter component 416 may include, for example, an RF transmitter for transmitting the signals described herein. In an aspect, the reception component 414 and the transmitter component 416 may be co-located in a transceiver.

In some instances, reference signals (e.g., SRS) may be transmitted for the purposes of reconstructing a channel (e.g., an uplink channel, sidelink channel, etc.). Further, the reference signals may be employed at the receiver to determine radio channel characteristics (e.g., channel state information) of the channels used between two devices (e.g., the UE 402 and the base station 404). For example, reference signals may be used to obtain signal strength measurements, and amplitude and phase estimates as a function of frequency, time and space. The radio channel characteristics may indicate signal propagation between the two devices, and represent the combined effect of scattering, fading, and power decay with distance. Further, the radio channel characteristics may be used to fully reconstruct the full channel matrix between the antennas of the two devices. For example, the radio channel characteristics may be used to reconstruct the downlink channel between all antennas at the UE 402 and the BS 404.

As described herein, the UE 402 may perform partial spatial sounding to assist the base station 404 in a channel reconstruction process. As described herein, in some aspects, "partial spatial sounding" may refer to a sounding operation in which less than all of the antennas of the antenna array 412 are employed to transmit reference signals. In some aspects, the UE 402 may transmit correlation capability information 418 to the base station 404. The correlation capability information 418 may indicate that the UE 402(1) is configured to perform partial spatial sounding by grouping the antennas of the antenna array 412(1) into antenna groups (i.e., grouping capability). Further, the correlation capability information 418 may include correlation information defining the correlation between antennas of the same antenna groups of the antenna array 412 and antennas in different antenna groups of the antenna array 412. In some aspects, the correlation information may include correlation metrics/values correlation between antennas of the same antenna groups of the antenna array 412 and antennas in different antenna groups of the antenna array 412 at each band or band combination. Further, the UE 402 may receive reference signal (RS) configuration information 420 from the base station 404. In response to receipt of the RS configuration information 420, the UE 402 may transmit one or more reference signals 422(1)-(N) to the base station 404 in accordance with configuration parameters defined within the RS configuration information 420. In some aspects, the RS configuration information 420 may define the antennas within the antenna array 412 that the UE 402 may employ to send the reference signals 422(1)-(N). In addition, the base station 404 may measure the reference signals and determine channel information based on the reference signals 422(1)-(N) 422(1)-(N) and the correlation information. In some instances, the UE 402 may send one or more correlation reports 424(1)-(N) including the correlation information. In some other instances, the base station 404 may determine the correlation information from the SRS grouping capability of the UE 402. Further, the base station 404 may send downlink data (DL data) 426 to the UE 402 based on the channel information. For example, the base station 404 may allocate resources for transmitting the DL data 426 according to channel quality indicators within the channel information. In some aspects, the channel information may include information pertaining to a full reconstruction of the downlink channel between the UE 402 and the base station 404.

In some examples, each antenna with the antenna array 412 may be identified as either a reference antenna that represents an antenna group or a non-reference antenna assigned to an antenna group, and the UE 402 may only transmit reference signals 422 from the reference antennas within the antenna array 412. Further, the base station 404 may determine channel state information associated with a non-reference antenna of the antenna array 412 based on a measurement of reference signals 422 transmitted by one or more reference antennas associated with the non-reference antenna and the correlation between the non-reference antenna and the one or more reference antennas. In some aspects, a non-reference antenna may be associated with reference antenna based on the non-reference antenna being in the same antenna group as the reference antenna or the non-reference antenna being in an antenna group having a correlation relationship with an antenna group of the reference antenna.

In some aspects, the correlation capability information 418 may include a SRS grouping capability that identifies at least a number of available reference antenna ports in an individual antenna group of the plurality of antenna groups, an amount of the plurality of antenna groups, or an amount of antenna ports in an individual antenna group of the plurality of antenna groups. For example, in some aspects, the SRS grouping capability may be a SRS grouping capability identifier having the following format: xTyGzR, where x represents the amount of reference antenna ports in an individual antenna group, y represents the amount of antenna groups, and z represents the amount of antennas in an individual antenna group.

As an example, xT4G2R may correspond to a UE 402 having four antenna groups, wherein each antenna group includes one reference antenna and one non-reference antenna. As another example, xT2G4R may correspond to a UE having two antenna groups, wherein each antenna group includes one reference antenna and three non-reference antennas. In these examples, the antenna groupings are uniform as each antenna group has an equal amount of antennas. Alternatively, in some examples, the antenna groups may have non-uniform antenna groups. For instance, xT2G may correspond to a UE having two antenna groups, wherein each antenna group includes one reference antenna. Further, the SRS grouping capability may further identify that the first antenna group is 4R (i.e., includes four antennas) and the second group is 2R (i.e., includes two antennas).

In addition, in some aspects, a SRS grouping capability identifier may correspond to predefined correlation information. As such, in some aspects, a base station 404 may determine correlation information based on the SRS grouping capability identifier received from the UE 402. Additionally, in some aspects, a UE 402 may have multiple SRS grouping capabilities. In other words, the UE 402 may have more than one means for configuring the antenna array 412 into antenna groups. Accordingly, the UE 402 may transmit correlation capability information 418 including a plurality of SRS grouping capability identifiers with each SRS grouping capability identifier representing a schema that may be employed by the UE 402 to configure the antenna array 412 into antenna groups. Further, in some aspects, the UE 402 may report the correlation capability information 418 to the base station 404 with a transmission of SRS switching information.

In some aspects, the base station 404 may determine the RS configuration information 420 based on the capabilities of the UE 402. For example, the base station 404 may receive the correlation capability information 418, select a SRS grouping capability included in the correlation capability information 418, and transmit the selected SRS grouping capability within the RS configuration information 420. As described above, the selected SRS grouping capability may configure a single reference antenna within each antenna group or a fixed number of reference port within each antenna group to transmit the reference signals 422. In some instances, the base station 404 may select the SRS grouping capability to be employed by the UE 402 based upon a device grouping or a device usage of the UE 402.

In some other aspects, the base station 404 may determine the RS configuration information 420 based on the capabilities of the UE 402 and the base station 404. For example, the base station 404 may receive the correlation capability information 418, select a SRS grouping capability included in the correlation capability information 418 based at least in part on one or more attributes of the base station 404 (e.g., device usage, device capabilities, etc.), and transmit the selected SRS grouping capability within the RS configuration information 420. In addition, in some instances, the base station may employ a RRC parameter within the SRS-resourceSET to indicate the number of reference ports within an individual group. For example, the SRS-resource-SET may include a parameter named srsGroup with a value indicating whether one, two, or four reference antennas may be used within a corresponding antenna group, as illustrated below in TABLE 1.

TABLE 1

| SRS-ResourceSet ::= | SEQUENCE { |
|---|---|
| srs-ResourceSet.Id | SRS-ResourceSet.Id, |
| ... | |
| srsGroup ENUMERATED [n1, n2, n4] | |
| ... | |
| ] | |

In some other aspects, the RS configuration information 420 may include PDSCH configuration information. For instance, the base station 404 may determine the amount of reference antennas to employ for PDSCH precoding based on a SRS setting, as illustrated in TABLE 2 below. Further, the SRS setting may be determined based upon usage of the UE 402 or a device group associated with the UE 402. In another instance, the base station 404 may determine the amount of reference antennas used for PDSCH precoding based at least in part on one or more attributes of the base station 404. In addition, in some instances, the base station 404 may employ a RRC parameter within the PDSCH-Config to indicate the amount of reference ports within an individual antenna group, as illustrated in TABLE 3 below. For example, the PDSCH configuration may include a parameter named srsGroup-Size with a value indicating whether one, two, or four reference antennas may be used within a corresponding antenna group. In some aspects, the value for the RRC parameter may be larger than the amount of SRS as the base station 404 may estimate the channel using the reference signals 422 and the correlation report 424.

TABLE 2

| PDSCH-Config : := | SEQUENCE { |
|---|---|
| ... ... ... . | |
| srsGroup-Size ENUMERATED [n1, n2, n4 ] | |
| ... ... ... . | |
| ] | |

TABLE 3

| PDSCH-Config : := | SEQUENCE { |
|---|---|
| ... ... ... . | |
| srsGroup-Size SEQUENCE (SIZE [1..maxNrofSRSGroup)) OF n1, n2, n4], | |
| ] | |

In some aspects, the UE 402 may transmit the correlation reports 424(1)-(N) in accordance with a fixed pattern. In some examples, the fixed pattern may be configured via RRC signaling. In some other aspects, the UE 402 may dynamically transmit the correlation reports 424(1)-(N). Further, the base station 404 may configure the periodicity of dynamic transmission of the correlation reports 424(1)-(N). In some aspects, the base station 404 may configure the UE 402 to periodically transmit the correlation reports 424(1)-(N) via a CSI report. In some instances, the CSI report may specifically correspond to transmission of correlation information. In some other aspects, the base station 404 may configure the UE 402 to transmit the correlation reports 424(1)-(N) via an uplink control information (UCI) message, or a medium access control (MAC) protocol control element (CE) dynamically triggered by a network (e.g., in response to a BWP change, activating a component carrier, timer based, etc.).

In some aspects, a partial correlation report is a correlation report that does not include correlation information for every antenna in the antenna array 412. For instance, partial correlation information may not include a correlation metric from any of the reference antennas of the antenna array 412 to a particular non-reference antenna of the antenna array 412. Further, the base station 404 may indicate to the UE 402 the information required within a partial correlation report to facilitate channel estimation. For instance, the base station 404 may indicate how many reference ports are needed to report sufficient correlation information for channel reconstruction by the base station 404. In some aspects, the base station 404 may configure the UE 402 to transmit a partial correlation report 424 using a CSI report configuration and/or a RRC parameter. Further, the base station 404 may determine correlation report configuration parameters for individual UEs based on UE groups and/or usage activity. As illustrated in FIG. 4B, the system 400 may include a UE 402(1) configured to communicate with another UE 402(2). Further, the UEs 402(1)-(2) may employ one or more channels 428(1)-(N) for sidelink communications between the UEs 402(1)-(2).

In some instances, reference signals (e.g., a SRS, a CSI-RS, SL RS, etc.) may be transmitted for the purposes of reconstructing a channel (e.g., sidelink channel, etc.). Further, the reference signals may be employed at the receiver to determine radio channel characteristics (e.g., channel state information) of the channel used to transmit the reference signal. For example, reference signals may be used to obtain signal strength measurements, and amplitude and phase estimates as a function of frequency, time and space. The radio channel characteristics may indicate signal propagation between UEs 402(1)-(2), and represent the combined effect of scattering, fading, and power decay with distance. Further, the radio channel characteristics may be used to reconstruct the full sidelink channel 428 between the UE 402(1) and 402(2).

As described herein, the UE 402(1) may perform partial spatial sounding to assist the UE 402(2) in a channel reconstruction process. In some aspects, the UE 402(1) may transmit correlation capability information 418 to the UE 402(2). The correlation capability information 418 may indicate that the UE 402(1) is configured to perform partial spatial sounding by grouping the antennas of the antenna array 412(1) into antenna groups (i.e., grouping capability). Further, the correlation capability information 418 may include correlation information defining the correlation between antennas of the same antenna groups of the antenna array 412 and antennas in different antenna groups of the antenna array 412. In some aspects, the correlation information may include correlation metrics/values correlation between antennas of the same antenna groups of the antenna array 412(1) and antennas in different antenna groups of the antenna array 412(1) at each band or band combination. Further, the UE 402(1) may receive RS configuration information 420 from the UE 402(2). In response to receipt of the RS configuration information 420, the UE 402(1) may transmit one or more reference signals 422(1)-(N) to the UE 402(2) in accordance with configuration parameters defined within the RS configuration information 420. In some aspects, the RS configuration information 420 may define the antennas within the antenna array 412 that the UE 402(1) may employ to send the reference signals 422(1)-(N). In addition, the UE 402(2) may measure the reference signals 422(1)-(N) and determine channel information based on the reference signals 422(1)-(N) and the correlation information. In some instances, the UE 402(1) may send one or more correlation reports 424(1)-(N) including the correlation information. In some other instances, the UE 402(2) may determine the correlation information from the SRS grouping capability of the UE 402(1).

As described in detail above with respect to FIG. 4A, the determined channel information may include channel information associated with the reference antennas of the UE 402(1) that transmitted the reference signals 422 to the UE 402(2) and non-reference antennas that did not send the reference signals 422 to the UE 402(2). Further, the UE 402(2) may send sidelink data (SL data) 430 to the UE 402(1) based on the channel information. For example, the UE 402(2) may allocate resources for transmitting SL data 430 according to a CSI, a RI, a CQI, and/or a PMI within the channel information. In some aspects, the channel information may include information pertaining to a full reconstruction of the sidelink channel between the UE 402 and the base station 404.

In some aspects, the correlation capability information 418 may include SRS grouping capability that identifies at least a number of available reference antenna ports in an individual antenna group of the plurality of antenna groups, an amount of the plurality of antenna groups, or an amount of antenna ports in an individual antenna group of the plurality of antenna groups. In addition, the SRS grouping capability may be a SRS grouping capability identifier which corresponds to predefined correlation information. As such, in some aspects, a UE 402(2) may determine correlation information based on the SRS grouping capability identifier received from the UE 402(1). Additionally, in some aspects, a UE 402(1) may have multiple SRS grouping capabilities. In other words, the UE 402(1) may have more than one means for configuring the antenna array 412 into antenna groups. Accordingly, the UE 402(1) may transmit correlation capability information 418 including a plurality of SRS grouping capability identifiers with each SRS grouping capability identifier representing a schema that may be employed by the UE 402(1) to configure the antenna array 412 into antenna groups.

In some aspects, the UE 402(2) may determine the RS configuration information 420 based on the capabilities of the UE 402(1). For example, the UE 402(2) may receive the correlation capability information 418, select a SRS grouping capability included in the correlation capability information 418, and transmit the selected SRS grouping capability within the RS configuration information 420. As described above, the selected SRS grouping capability may configure a single reference antenna within each antenna group or a fixed number of reference port within each antenna group to transmit the reference signals 422. In some instances, the UE 402(2) may select the SRS grouping capability to be employed by the UE 402(1) based upon a device grouping or a device usage of the UE 402(1).

In some aspects, the UE 402(1) may transmit the correlation report 424 in accordance with a fixed pattern. In some examples, the fixed pattern may be configured via RRC signaling. In some other aspects, the UE 402(1) may dynamically transmit the correlation report 424. Further, the UE 402(2) may configure the periodicity of dynamic transmission of the correlation report 424.

In some aspects, the correlation report may be a partial correlation report that does not include correlation information for every antenna in the antenna array 412. For instance, partial correlation information may not include a correlation metric from any of the reference antennas of the antenna array 412 to a particular non-reference antenna of the antenna array 412. Further, the UE 402(2) may indicate to the UE 402(1) the information required within a partial correlation report to facilitate channel estimation. For instance, the UE 402(2) may indicate how many reference ports are needed to report sufficient correlation information for channel estimation by the UE 402(2). In some aspects, the UE 402(2) may configure the UE 402(1) to transmit a partial correlation report 424 using a CSI report configuration and/or a RRC parameter. Further, the UE 402(2) may determine correlation report configuration parameters for individual UEs based on UE groups and/or usage activity.

Figure 5:
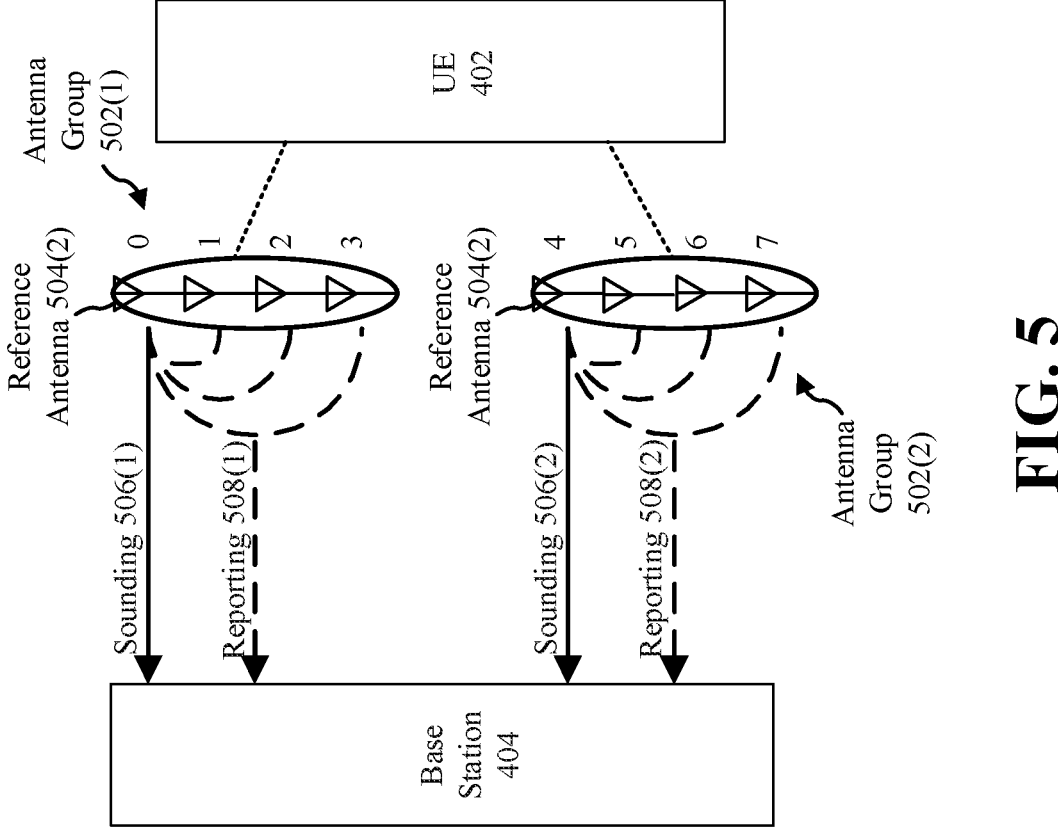
FIG. 5 is a diagram of an example of antenna grouping in a partial spatial sounding environment, in accordance with some aspects of the present disclosure.
Figure 5:
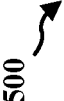

FIG. 5 is a diagram 500 of an example of antenna grouping in a partial spatial sounding environment, in accordance with some aspects of the present disclosure. As illustrated in FIG. 5, the antenna array 412 of the UE 402 may be organized at least two antenna groups 502(1)-(2). Further, each antenna group 502 may include at least one reference antenna 504. As described herein, the reference antennas 504(1)-(2) may transmit sounding signals 506 (e.g., the reference signals 422(1)-(N in a partial spatial sounding process. In addition, the UEs 402(1) may transmit reporting messages 508(1)-(2) (e.g., the correlation reports 424(1)-(N) to the base station 404. Further, the base station 404 may determine channel information for the other antennas within the antenna groups 502(1)-(2) based on the sounding signals 506(1)-(2) and the reporting messages 508(1)-(2).

In some aspects, the spatial correlation matrix for N antenna elements in one dimension is:

$$R=[r_{ij}]_{i,j=1,\ldots,N}, r_{ij}=\alpha^{(d_{ij})^2} \qquad \text{Equations 1 and 2}$$

Where $d_{ij}=|i-j|$ is the antenna spatial separation between antennas i and j, $\alpha$ is a reference correlation that is the envelope correlation between the closest cross-polarized antenna elements. In some instances, antennas having medium correlation or high correlation may be organized into the same antenna group 502. Medium correlation or high correlation may correspond to predefined values configured based on requirements of UEs or base stations employing partial spatial sounding. Further, antennas having low correlation may be placed in different antenna groups 502. In addition, the low correlation value may be relative to the high correlation metric or medium correlation metric. For example, if high" correlation means "$r_{ij}=0.8$", then "low" may mean "$r_{ij}=0.8/2$", which is half of the high correlation metric.

Figure 6:
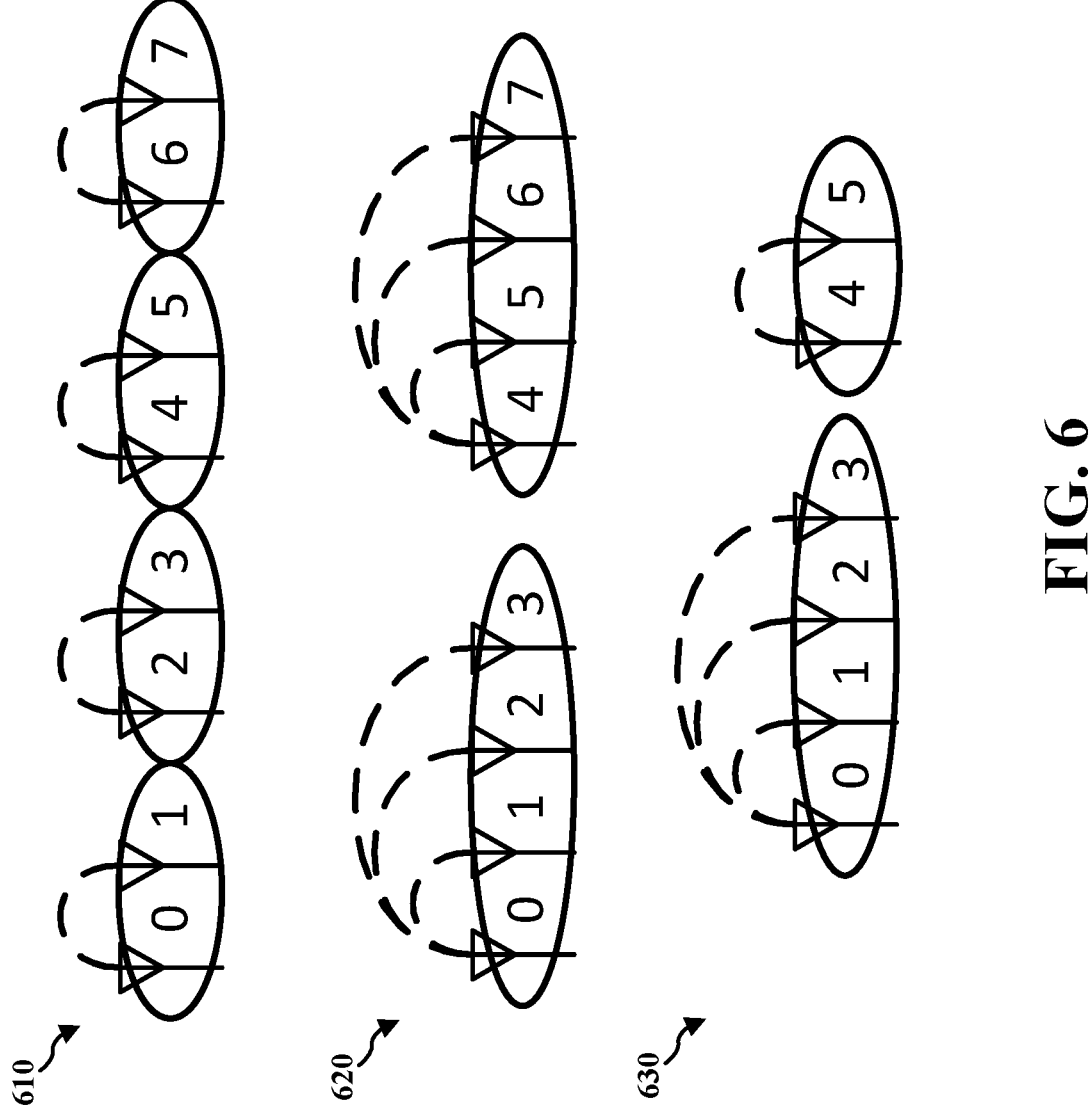
FIG. 6 is a diagram of examples of antenna matrices organized according to a SRS grouping capabilities, in accordance with some aspects of the present disclosure.

FIG. 6 is a diagram 600 of examples of antenna matrices organized according to SRS grouping capabilities, in accordance with some aspects of the present disclosure. As illustrated in FIG. 6, the antenna array 412 can be organized into an xT4G2R SRS grouping capability 610, an xT2G4R SRS grouping capability 620, and a 4R first group and 2R second group xT2G SRS grouping capability 630.

Figure 7:
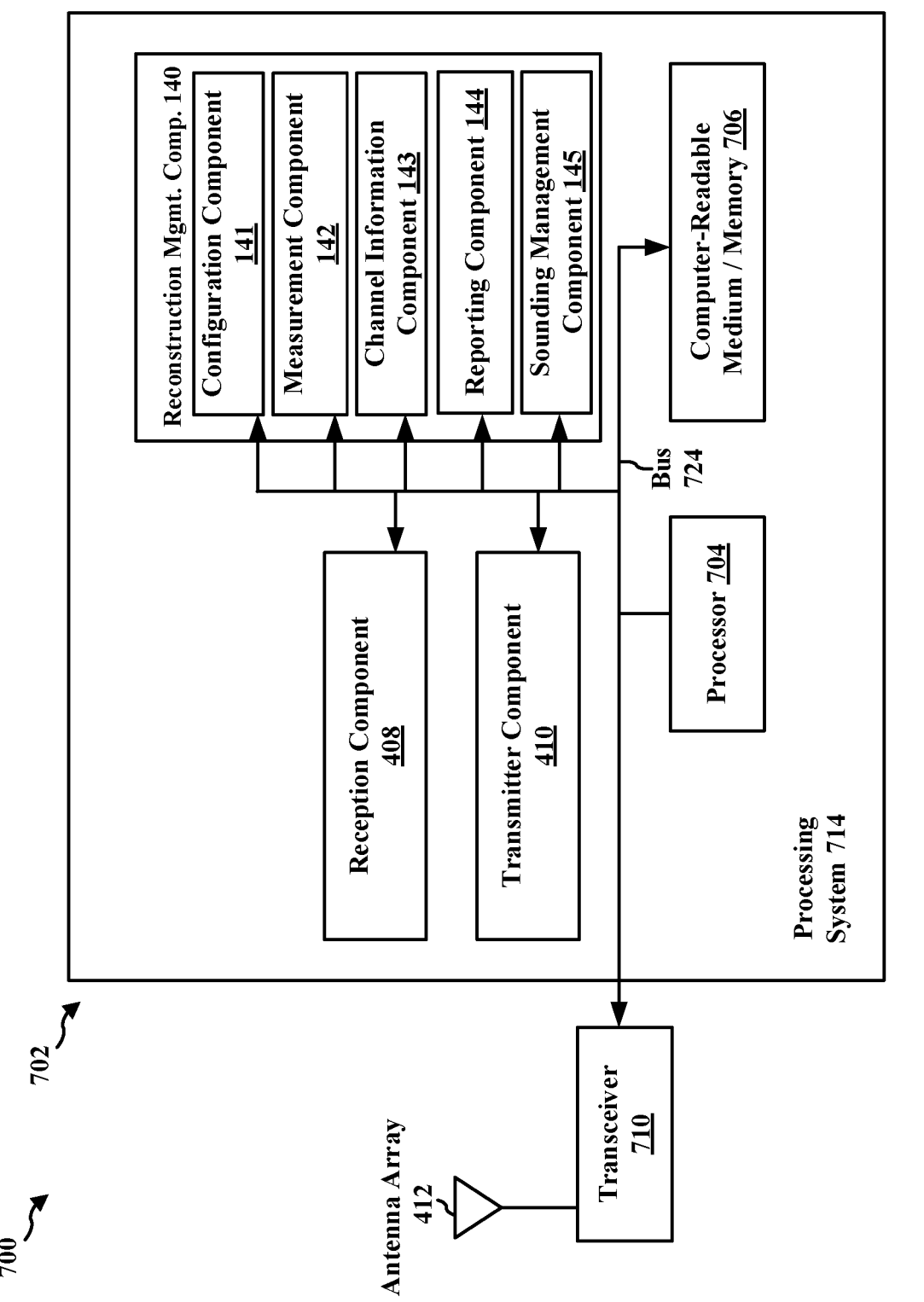
FIG. 7 is a diagram illustrating an example of a hardware implementation for a UE employing a processing system, in accordance with some aspects of the present disclosure.

FIG. 7 is a diagram 700 illustrating an example of a hardware implementation for a UE 702 (e.g., the UE 104, the UE 402, etc.) employing a processing system 714. The processing system 714 may be implemented with a bus architecture, represented generally by the bus 724. The bus 724 may include any number of interconnecting buses and/or bridges depending on the specific application of the processing system 714 and the overall design constraints. The bus 724 links together various circuits including one or more processors and/or hardware components, represented by the processor 704, the reconstruction management component 140, the configuration component 141, the measurement component 142, the channel information component 143, the reporting component 144, the sounding management component 145, and the computer-readable medium (e.g., non-transitory computer-readable medium)/memory 706. The bus 724 may also link various other circuits such as timing sources, peripherals, voltage regulators, and power management circuits, which are well known in the art, and therefore, will not be described any further.

The processing system 714 may be coupled with a transceiver 710. The transceiver 710 may be coupled with the antenna array 412. The transceiver 710 provides a means for communicating with various other apparatus over a transmission medium. The transceiver 710 receives a signal from the antenna array 412, extracts information from the received signal, and provides the extracted information to the processing system 714, specifically the reception component 408. In addition, the transceiver 710 receives information from the processing system 714, specifically the transmitter component 410, and based on the received information, generates a signal to be applied to the antenna array 412. The processing system 714 includes a processor 704 coupled with a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 may further includes reconstruction management component 140. The component may be a software component running in the processor 704, resident/stored in the computer readable medium/memory 706, one or more hardware components coupled with the processor 704, or some combination thereof. The processing system 714 may be a component of the UE 350 and may include the memory 360 and/or at least one of the TX processor 368, the RX processor 356, and the controller/processor 359. Alternatively, the processing system 714 may be the entire UE (e.g., see 350 of FIG. 3).

The reconstruction management component 140 may be configured to manage channel reconstruction based on partial spatial sounding. The reconstruction management component 140 may include the configuration component 141, the measurement component 142, and the channel information component 143.

The configuration component 141 may be configured to receive correlation capability information 418 from another UE, and determine RS configuration information 420 for configuring a partial spatial sounding process at the other UE. The correlation capability information 418 may indicate SRS grouping capability of the other UE device and/or correlation information specifying the correlation between the reference antennas of the other UE and the non-reference antennas of the other UE. In some aspects, the configuration component 141 may determine the antenna grouping of the antenna matrix of the other device, and transmit the RS configuration information 420 including the antenna grouping to the other UE. Further, in some aspects, the configuration component 141 may determine that the other UE may transmit correlation reports to the UE 702, the periodicity of the transmission of the correlation reports 424(1)-(N), and the contents of the correlation reports 424(1)-(N) (e.g., partial correlation report or full correlation report). Additionally, or alternatively, the reconstruction management component 140 may be configured to transmit the correlation reports 424(1)-(N) in a CSI, UCI, and/or MAC-CE.

The measurement component 142 may be configured to measure reference signals 422(1)-(N) transmitted from the other UE in accordance with the RS configuration information 420. In some aspects, the measurement component 142 may determine signal strength measurements for reference signals 422(1)-(N) received from the other UE. Further, the channel information component 143 may determine the signal strength of a non-reference antenna by identifying the correlation metric between the non-reference antenna and a reference antenna, and multiplying the correlation metric by the signal strength measurement of a reference signal 422 transmitted by the reference antenna. In addition, the channel information component 143 may generate channel information (e.g., CSI, RI, CQI, PMI) based on the correlation information and the measurements captured by the measurement component 142. In some aspects, the other UE may send a correlation report 424 including the correlation information. Once the channel information component 143 determines the channel information, the UE 702 may transmit sidelink data to the other UE via a fully reconstructed sidelink channel based on the channel information.

In addition, the reconstruction management component 140 may be further configured to transmit correlation capability information 118 to a base station 404 or another UE. In some instances, the UE 702 may receive RS configuration information 420 indicating a selection of a SRS grouping capability by the base station 404 or other UE. In response, the reconstruction management component 140 may facilitate performance of the partial spatial sounding process using the antenna grouping identified by the SRS grouping capability. Further, the reconstruction management component 140 may be configured to transmit correlation reports 424(1)-(N) to the base station 404 or the other UE. In some aspects, the reconstruction management component 140 may be configured to send correlation reports 424(1)-(N) in accordance with configuration parameters included in the RS configuration information 420.

The sounding management component 145 may be configured to transmit the reference signals 422(1)-(N). In some aspects, the sounding management component 145 may be configured to transmit the reference signals 422(1)-(N) in accordance with the RS configuration information 420. For example, the RS configuration information 420 may identify the antenna groupings and the one or more reference antennas for each antenna group.

The aforementioned means may be one or more of the aforementioned components of the UE 702 and/or the processing system 714 of UE 702 configured to perform the functions recited by the aforementioned means. As described supra, the processing system 714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
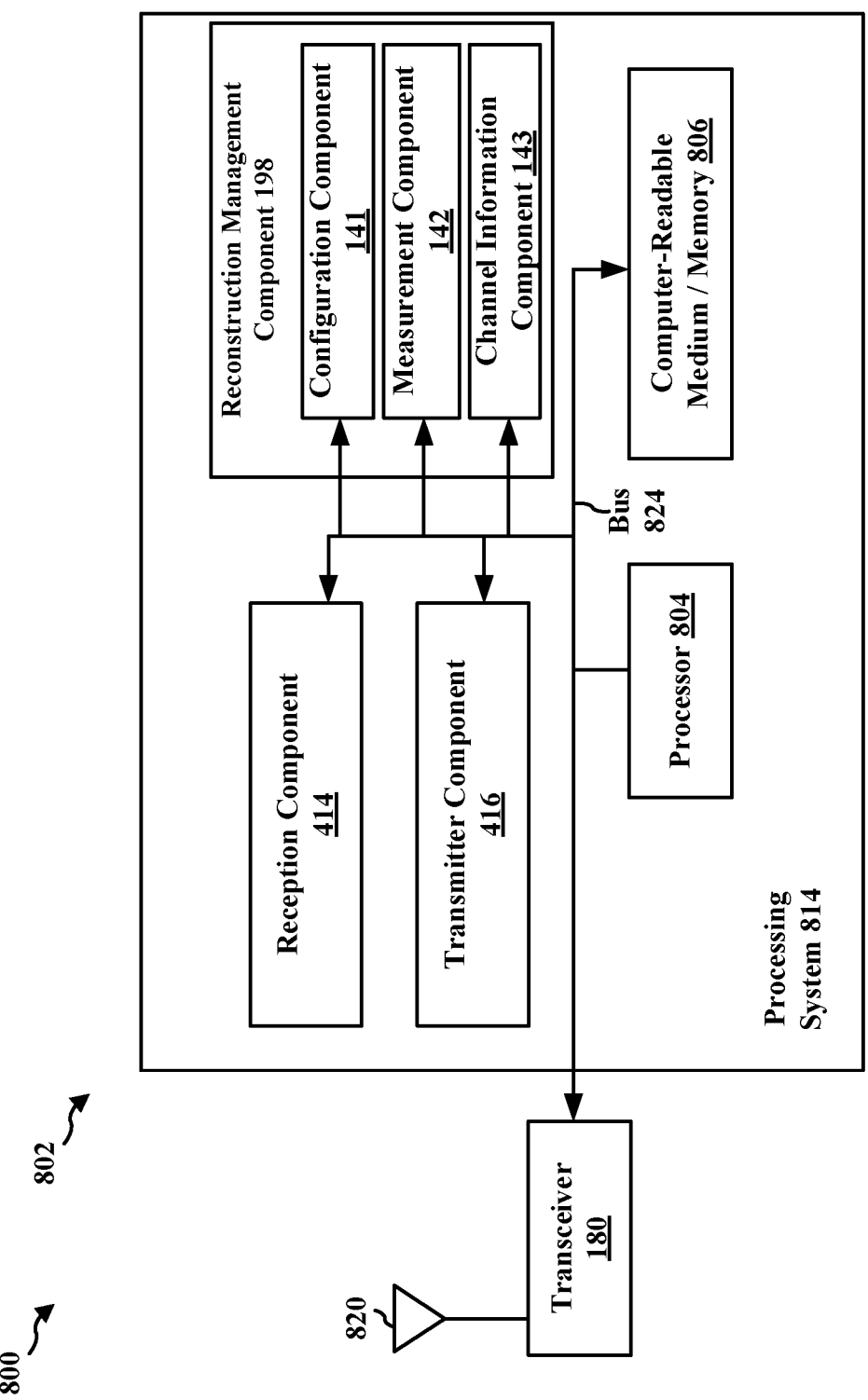
FIG. 8 is a diagram illustrating an example of a hardware implementation for a base station employing a processing system, in accordance with some aspects of the present disclosure.

FIG. 8 is a diagram 800 illustrating an example of a hardware implementation for a base station 802 (e.g., the base station 404, etc.) employing a processing system 814. The processing system 814 may be implemented with a bus architecture, represented generally by the bus 824. The bus

824 may include any number of interconnecting buses and bridges depending on the specific application of the processing system 814 and the overall design constraints. The bus 824 links together various circuits including one or more processors and/or hardware components, represented by the processor 804, the reconstruction management component 198, the configuration component 141, the measurement component 142, the channel information component 143, and the computer-readable medium (e.g., non-transitory computer-readable medium)/memory 808. The bus 824 may also link various other circuits such as timing sources, peripherals, voltage regulators, and power management circuits, which are well known in the art, and therefore, will not be described any further.

The processing system 814 may be coupled with a transceiver 810. The transceiver 810 may be coupled with one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 414. In addition, the transceiver 810 receives information from the processing system 814, specifically the transmitter component 416, and based on the received information, generates a signal to be applied to the one or more antennas 820. The processing system 814 includes a processor 804 coupled with a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes the reconstruction management component 198. The component may be a software component running in the processor 804, resident/stored in the computer readable medium/memory 806, one or more hardware components coupled with the processor 804, or some combination thereof. The processing system 814 may be a component of the base station 310 and may include the memory 376 and/or at least one of the TX processor 316, the RX processor 370, and the controller/processor 375. Alternatively, the processing system 814 may be the entire base station (e.g., see 310 of FIG. 3).

The reconstruction management component 198 may be configured to manage channel reconstruction based on partial spatial sounding. The reconstruction management component 140 may include the configuration component 141, the measurement component 142, and the channel information component 143.

The configuration component 141 may be configured to receive correlation capability information 418 from the UE 402, and determine RS configuration information 420 for configuring a partial spatial sounding process at the UE 402. The correlation capability information 418 may include a SRS grouping capability of the UE device 402 and/or correlation information specifying the correlation between the reference antennas of the UE 402 and the non-reference antennas of the UE 402. In some aspects, the configuration component 141 may determine the antenna grouping of the antenna matrix of the UE 402, and transmit the RS configuration information 420 including the antenna grouping to the UE 402. Further, in some aspects, the configuration component 141 may determine that the UE 402 may transmit correlation reports to the base station 802, the periodicity of the transmission of the correlation reports 424(1)-(N), and the contents of the correlation reports 424(1)-(N) (e.g., partial correlation report or full correlation report). Additionally, or alternatively, the reconstruction management component 140 may be configured to transmit the correlation reports 424(1)-(N) in a CSI, UCI, and/or MAC-CE.

The measurement component 142 may be configured to measure reference signals 422(1)-(N) transmitted from the UE 402 in accordance with the RS configuration information 420. In some aspects, the measurement component 142 may determine signal strength measurements for the reference signals 422(1)-(N) received from the UE 402. In addition, the channel information component 143 may generate channel information based on the correlation information and the measurements captured by the measurement component 142. In some aspects, the UE 402 may send a correlation report 424 including the correlation information. Once the channel information component 143 determines the channel information, the base station 802 may transmit DL data to the UE 402 via a fully reconstructed downlink channel based on the channel information.

The aforementioned means may be one or more of the aforementioned components of the base station 802 and/or the processing system 814 of the base station 802 configured to perform the functions recited by the aforementioned means. As described supra, the processing system 814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

FIG. 9 is a flowchart of a method 900 of partial spatial sounding, in accordance with some aspects of the present disclosure. The method may be performed by a UE (e.g., the UE 104 of FIGS. 1 and 3, which may include the memory 360 and which may be the entire UE 104 or a component of the UE 104, such as the reconstruction management component 140, the TX processor 368, the RX processor 356, and/or the controller/processor 359; the UE 402 of FIG. 4; and/or the UE 702 of FIG. 7).

At block 910, the method 900 may include transmitting, to another device, correlation capability information indicating a SRS grouping capability of the UE. For example, the UE 402(1) may transmit, to the base station 404 or another UE 402(2), correlation capability information 418 indicating a SRS grouping capability of the UE 402(1).

At sub-block 912, the block 910 may optionally include transmitting the SRS grouping capability identifying a plurality of antenna groups, the SRS grouping capability identifying at least one of a number of available reference antenna ports in an individual antenna group of the plurality of antenna groups, an amount of the plurality of antenna groups, or an amount of antenna ports in an individual antenna group of the plurality of antenna groups. For example, the reconstruction management component 140 may transmit the SRS grouping capability identifying a plurality of antenna groups 502, the SRS grouping capability identifying at least one of a number of available reference antennas 504 in an individual antenna group of the plurality of antenna groups 502, an amount of the plurality of antenna groups 502, or an amount of antenna ports in an individual antenna group of the plurality of antenna groups 502.

Accordingly, the UE 104, the UE 402, UE 702, the TX processor 368, the RX processor 356, and/or the controller/processor 359, executing the reconstruction management component 140 may provide means for transmitting, to another device, correlation capability information indicating a SRS grouping capability of the UE.

At block 920, the method 900 may include receiving, from the another device, RS configuration information for configuring a sounding procedure to be performed by the UE. For example, the reconstruction management component 140 may receive the RS configuration information 420 from the base station 404 or the other UE 402(2).

Accordingly, the UE 104, the UE 402, UE 702, the TX processor 368, the RX processor 356, and/or the controller/processor 359, executing the reconstruction management component 140 may provide means for receiving, from the another device, RS configuration information for configuring a sounding procedure to be performed by the UE.

At block 930, the method 900 may optionally include transmitting a correlation report to the another device, the correlation report including the correlation information defining a correlation between the reference antenna port and at least the another antenna port. For example, the reconstruction management component 140 may transmit a correlation report 424 to the base station 404 or another UE 402(2), the correlation report 426 including the correlation information defining a correlation between the reference antenna port 504(1) and at least another antenna port of the antenna group 502(1).

Accordingly, the UE 104, the UE 402, UE 702, the TX processor 368, the RX processor 356, and/or the controller/processor 359, executing the reconstruction management component 140 may provide means for transmitting a correlation report to the another device, the correlation report including the correlation information defining a correlation between the reference antenna port and at least the another antenna port.

At block 940, the method 900 may include transmitting, based on the RS configuration information, a reference signal to the another device over a reference antenna port of the UE to allow the another device to determine channel information for another antenna port of the UE based on the reference signal and correlation information. For example, the sounding management component 145 may transmit, based on the RS configuration information 420, a reference signal 422(1) to the base station 404 or another UE 402(2) over a reference antenna port 504(1) of the UE 402(1) based on the RS configuration information 420 to allow the base station 404 or the other UE 402(2) to determine channel information for another antenna port of the UE 402(1) based on the reference signal 422(1) and correlation information.

Accordingly, the UE 104, the UE 402, UE 702, the TX processor 368, the RX processor 356, and/or the controller/processor 359, executing the sounding management component 145 may provide means for transmitting, based on the RS configuration information, a reference signal to the another device over a reference antenna port of the UE to allow the another device to determine channel information for another antenna port of the UE based on the reference signal and correlation information.

At block 950, the method 900 may include receiving data from the another device based on the channel information. For example, the UE 402 may receive the DL data 426 from the base station 404 based on the channel information. As another example, the UE 402(1) may receive the SL data 430 from the UE 402(2) based on the channel information.

Accordingly, the UE 104, the UE 402, UE 702, the TX processor 368, the RX processor 356, and/or the controller/processor 359, executing the reconstruction management component 140 may provide means for receiving data from the another device based on the channel information.

FIG. 10 is a flowchart of a method 1000 of UE assisted channel reconstruction based on partial spatial sounding, in accordance with some aspects of the present disclosure. The method may be performed by a base station (e.g., the base station 102/180 of FIGS. 1 and 3, which may include the memory 376 and which may be the entire base station or a component of the base station, such as reconstruction management component 198, the TX processor 316, the RX processor 370, and/or the controller/processor 375; the base station 404 of FIG. 4; the base station 802 of FIG. 8. In addition, The method may be performed by a UE (e.g., the UE 104 of FIGS. 1 and 3, which may include the memory 360 and which may be the entire UE 104 or a component of the UE 104, such as the reconstruction management component 140, the TX processor 368, the RX processor 356, and/or the controller/processor 359; the UE 402 of FIG. 4; and/or the UE 702 of FIG. 7).

At block 1010, the method 1000 may include receiving, from a UE, correlation capability information indicating a SRS grouping capability of the UE. For example, the base station 404 or the UE 402(2) may receive, from the UE 402(1), correlation capability information 418 indicating a SRS grouping capability of the UE 402(1).

Accordingly, the base station 102, the base station 404, the base station 802, the TX processor 316, the RX processor 370, and/or the controller/processor 375 executing the reconstruction management component 198 may provide means for receiving, from a UE, correlation capability information indicating a SRS grouping capability of the UE. Further, the UE 104, the UE 402, UE 702, the TX processor 368, the RX processor 356, and/or the controller/processor 359, executing the reconstruction management component 140 may provide means for receiving, from a UE, correlation capability information indicating a SRS grouping capability of the UE.

At block 1020, the method 1000 may include determining RS configuration information for configuring a sounding procedure to be performed by the UE. For example, the base station 404 or the UE 402(2) may determine the RS configuration information 420. In some aspects, the RS configuration information 420 may define the antennas within the antenna array 412 that the UE 402 may use to transmit the reference signals 422(1)-(N).

Accordingly, the base station 102, the base station 404, the base station 802, the TX processor 316, the RX processor 370, and/or the controller/processor 375 executing the configuration component 141 may provide means for determining RS configuration information for configuring a sounding procedure to be performed by the UE 402. Further, the UE 104, the UE 402, UE 702, the TX processor 368, the RX processor 356, and/or the controller/processor 359, executing the configuration component 141 may provide means for determining RS configuration information for configuring a sounding procedure to be performed by the UE 402(1).

At block 1030, the method 1000 may include transmitting the RS configuration information to the UE. For example, the base station 404 or the UE 402(2) may transmit the RS configuration information 420 to the UE 402(1). In some aspects, the RS configuration information 420 may define the antennas within the antenna array 412 that the UE 402 may use to transmit the reference signals 422(1)-(N).

Accordingly, the base station 102, the base station 404, the base station 802, the TX processor 316, the RX processor 370, and/or the controller/processor 375 executing the reconstruction management component 198 may provide means for transmitting the RS configuration information to the UE. Further, the UE 104, the UE 402, UE 702, the TX processor 368, the RX processor 356, and/or the controller/processor 359, executing the reconstruction management component 140 may provide means for transmitting the RS configuration information to the UE.

At block 1040, the method 1000 may include measuring a reference signal received from a reference antenna port of the UE to determine measurement information, the reference signal transmitted based on the RS configuration information. For example, the base station 404 or the UE 402(2) may measure the signal strength of the reference signals 422(1)-(N) transmitted by the UE 402(1) in accordance with the RS configuration information 420.

Accordingly, the base station 102, the base station 404, the base station 802, the TX processor 316, the RX processor 370, and/or the controller/processor 375 executing the measurement component 142 may provide means for measuring a reference signal received from a reference antenna port of the UE to determine measurement information, the reference signal transmitted based on the RS configuration information. Further, the UE 104, the UE 402, UE 702, the TX processor 368, the RX processor 356, and/or the controller/processor 359, executing the measurement component 142 may provide means for measuring a reference signal received from a reference antenna port of the UE to determine measurement information, the reference signal transmitted based on the RS configuration information.

At block 1050, the method 1000 may include determining channel information associated with the UE based on the measurement information and correlation information. For example, the base station 404 or the UE 402(2) may generate channel information based on the signal strength measurements and correlation information. In some examples, the channel information may include information representing the reconstruction of a channel (e.g., the downlink channel or the sidelink channel).

Accordingly, the base station 102, the base station 404, the base station 802, the TX processor 316, the RX processor 370, and/or the controller/processor 375 executing the channel information component 143 may provide means for determining channel information associated with the UE based on the measurement information and correlation information. Further, the UE 104, the UE 402, UE 702, the TX processor 368, the RX processor 356, and/or the controller/processor 359, executing channel information component 143 may provide means for determining channel information associated with the UE based on the measurement information and correlation information.

At block 1060, the method 1000 may include transmitting data to the UE based on the channel information. For example, the base station 404 may transmit DL data 426 to the UE based on the channel information. As another example, the UE 402(2) may transmit the SL data 430 to the UE 402(1) based on the channel information. In particular, in some aspects, the base station 404 and/or the UE 402(2) may use the channel information to select the appropriate coding and modulation schemes, and/or to facilitate spatial processing for transmission of data (e.g., DL data 426, or SL data 430).

Accordingly, the base station 102, the base station 404, the base station 802, the TX processor 316, the RX processor 370, and/or the controller/processor 375 executing the reconstruction management component 198 may provide means for transmitting data to the UE based on the channel information. Further, the UE 104, the UE 402, UE 702, the TX processor 368, the RX processor 356, and/or the controller/processor 359, executing the reconstruction management component 140 may provide means for transmitting data to the UE based on the channel information.

The specific order or hierarchy of blocks in the processes/ flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Clauses

A. A method of wireless communication at a user equipment (UE): transmitting, to another device, correlation capability information indicating a sounding reference signal (SRS) grouping capability of the UE; receiving, from the another device, reference signal (RS) configuration information for configuring a sounding procedure to be performed by the UE; transmitting, based on the RS configuration information, a reference signal to the another device over a reference antenna port of the UE to allow the another device to determine channel information for another antenna port of the UE based on the reference signal and correlation information; and receiving data from the another device based on the channel information.

B. The method as paragraph A recites, wherein transmitting the correlation capability information comprises transmitting the SRS grouping capability identifying a plurality of antenna groups, the SRS grouping capability identifying at least one of a number of available reference antenna ports in an individual antenna group of the plurality of antenna groups, an amount of the plurality of antenna groups, or an amount of antenna ports in an individual antenna group of the plurality of antenna groups.

C. The method as any of paragraphs A-B recite, wherein transmitting the correlation capability information comprises: transmitting a SRS grouping capability identifier that identifies the correlation information and defines: a first antenna group including the reference antenna port and the another antenna port, or a second antenna group including the reference antenna port and a third antenna group including the another antenna port.

D. The method as any of paragraphs A-C recite, wherein transmitting the correlation capability information comprises transmitting a plurality of SRS grouping capabilities including the SRS grouping capability, and wherein receiving the RS configuration information comprises receiving a selection of the SRS grouping capability.

E. The method as any of paragraphs A-D recite, wherein an amount of antenna ports in each antenna group associated with the SRS grouping capability is uniform.

F. The method as any of paragraphs A-D recite, wherein an amount of antenna ports in each antenna group associated with the SRS grouping capability is non-uniform.

G. The method as any of paragraphs A-F recite, wherein receiving the RS configuration information comprises receiving an identifier of the reference antenna port from the another device, the reference antenna port selected by the another device based on the correlation capability information.

H. The method as any of paragraphs A-F recite, wherein receiving the RS configuration information comprises receiving one or more antenna identifiers of one or more reference antenna ports from the another device, the one or more reference antenna ports selected by the another device based on an attribute of the another device and the one or more antenna identifiers including an identifier of the reference antenna port.

I. The method as any of paragraphs A-H recite, further comprising determining an amount of antenna ports to be used for physical downlink shared channel (PDSCH) precoding based on the RS configuration information.

J. The method as any of paragraphs A-I recite, wherein receiving the RS configuration information comprises receiving an indication of an amount of antenna ports to be used for physical downlink shared channel (PDSCH) precoding within radio resource control (RRC) signaling.

K. The method as any of paragraphs A-J recite, further comprising: transmitting a correlation report to the another device, the correlation report including the correlation information defining a correlation between the reference antenna port and at least the another antenna port.

L. The method as paragraph K recites, wherein transmitting the correlation report to the another device comprises transmitting, based on reporting configuration information received from the another device, the correlation report to the another device via a channel state information report.

M. The method as paragraph K recite, wherein transmitting the correlation report to the another device comprises transmitting, based on reporting configuration information received from the another device, the correlation report to the another device via an uplink control information (UCI) message.

N. The method as paragraph K recite, wherein transmitting the correlation report to the another device comprises transmitting the correlation report to the another device via a medium access control (MAC) protocol control element (CE) triggered by a network.

O. The method as any of paragraphs K-N recite, wherein the correlation information is first correlation information, the reference antenna port is a first antenna port, the another antenna port is a second antenna port, and transmitting the correlation report to the another device comprises transmitting a partial correlation report with the first correlation information and without second correlation information corresponding to a correlation between the first antenna port and a third antenna port of the UE that belongs to an antenna group different from the first antenna port and the second antenna port.

P. The method as paragraph O recite, further comprising receiving reporting configuration information indicating an amount of the correlation information needed by the another device, and wherein transmitting the correlation report to the another device comprises transmitting the partial correlation report based on the reporting configuration information.

Q. The method as any of paragraphs A-P recite, wherein the another device is a base station.

R. The method as any of paragraphs A-Q recite, wherein transmitting the reference signal comprises transmitting a SRS to the another device over the reference antenna port.

S. The method as any of paragraphs A-P or R recite, wherein the UE is a first UE, and the another device is a second UE.

T. The method as paragraph S recites, further comprising transmitting a correlation report to the second UE via a sidelink channel, the correlation report identifying a correlation between the reference antenna port and at least the another antenna port.

U. The method as paragraph S recites, wherein transmitting the reference signal comprises transmitting a channel state information reference signal (CSI-RS) to the second UE over the reference antenna port.

V. The method as any of paragraphs A-U recite, wherein the UE is a 5G new radio (NR) user equipment.

W. A UE for wireless communication, comprising: a memory storing computer-executable instructions; and at least one processor coupled with the memory and configured to execute the computer-executable instructions to perform a method as any of paragraphs A-V recite.

X. A device comprising means for performing a method as any of paragraphs A-V recite.

Y. A non-transitory computer-readable medium storing computer executable code, the code when executed by a processor causes the processor to perform a method as any of paragraphs A-V recite.

Z. A method of wireless communication at a device, comprising: receiving, from a user equipment (UE), correlation capability information indicating a sounding reference signal (SRS) grouping capability of the UE; determining reference signal (RS) configuration information for configuring a sounding procedure to be performed by the UE; transmitting the RS configuration information to the UE; measuring a reference signal received from a reference antenna port of the UE to determine measurement information, the reference signal transmitted based on the RS configuration information; determining channel information associated with the UE based on the measurement information and correlation information; and transmitting data to the UE based on the channel information.

AA. The method as paragraph Z recites, wherein the reference antenna port is a first antenna port, the another antenna port is a second antenna port, and determining channel information associated with the UE comprises determining channel state information corresponding to the first antenna port and the second antenna port of a first antenna grouping including and a third antenna port of a second antenna grouping.

AB. The method as paragraphs Z-AA recites, further comprising determining the correlation information based on the SRS grouping capability.

AC. The method as paragraphs Z-AB recite, wherein receiving the correlation capability information comprises receiving a plurality of SRS grouping capabilities, and further comprising: selecting the SRS grouping capability; and transmitting an identifier of the SRS grouping capability to the UE.

AD. The method as paragraph AC recites, wherein selecting the SRS grouping capability comprises selecting the SRS grouping capability associated with a plurality of antenna groups having a uniform amount of antenna ports.

AE. The method as paragraph AC recites, wherein selecting the antenna grouping comprises selecting the SRS grouping capability associated with a plurality of antenna groups having a non-uniform amount of antenna ports.

AF. The method as any of paragraphs Z-AE recite, wherein determining the RS configuration information comprises determining the reference antenna port based on the SRS grouping capability.

AG. The method as any of paragraphs Z-AE recite, wherein determining the RS configuration information comprises determining one or more reference antenna ports based on an attribute of the device.

AH. The method as any of paragraphs Z-AG recite, wherein determining the RS configuration information comprises determining an amount of antenna ports to be used for physical downlink shared channel (PDSCH) precoding based on the SRS grouping capability.

AI. The method as any of paragraphs Z-AG recite, wherein determining the RS configuration information comprises determining an amount of antenna ports to be used for physical downlink shared channel (PDSCH) precoding based on an attribute of the device, and transmitting the RS configuration information comprises transmitting the RS configuration via radio resource control (RRC) signaling.

AJ. The method as any of paragraphs Z-AI recite, further comprising receiving a correlation report from the UE, the correlation report including the correlation information defining a correlation between the reference antenna port and at least the another antenna port.

AK. The method as paragraph AJ recites, wherein receiving the correlation report comprises receiving the correlation report via a channel station information report.

AL. The method as paragraph AJ recites, wherein receiving the correlation report comprises receiving the correlation report via an uplink control information (UCI) message.

AM. The method as paragraph AJ recites, wherein receiving the correlation report comprises receiving the correlation report via a medium access control (MAC) protocol control element (CE) triggered by a network.

AN. The method as paragraph AJ recites, wherein the correlation information is first correlation information, the reference antenna port is a first antenna port, the another antenna port is a second antenna port, and receiving the correlation report comprises receiving a partial correlation report with the first correlation information and without second correlation information corresponding to a correlation between the reference antenna port and a third antenna port of the UE that belongs to an antenna group different from the first antenna port and the second antenna port, and wherein determining the channel information associated with the UE comprises determining channel information corresponding to the antenna group including the third antenna port.

AO. The method as paragraph AN recites, further comprising transmitting an indication identifying an amount of antenna ports to employ in performing the sounding procedure based on the partial correlation report.

AP. The method as any of paragraphs Z-AO recite, wherein the device is a 5G new radio (NR) base station.

AQ. The method as any of paragraphs Z-AO recite, wherein the device is a 5G new radio (NR) wireless user equipment device.

AR. The method as paragraph AQ recites, further comprising receiving a correlation report from the UE via a sidelink channel, the correlation report including the correlation information defining a correlation between the reference antenna port and at least the another antenna port.

AS. The method as paragraph AR recites, wherein the correlation report further includes antenna grouping information identifying a plurality of antenna groups at the UE and one or more reference antenna ports within the plurality of antenna groups.

AT. The method as paragraph AR recites, wherein the reference signal is a channel state information reference signal (CSI-RS), and determining the RS configuration information comprises determining a parameter for configuring the UE to transmit the CSI-RS.

AU. The method as paragraph AR recites, wherein the channel information is channel state information (CSI), and further comprising transmitting at least one of a rank indicator, a channel quality indicator (CQI), or a precoder matrix indicator (PMI) to the UE based on the CSI.

AV. The method as any of paragraphs Z-AU recite, wherein the UE is a 5G new radio (NR) user equipment.

AW. A device for wireless communication, comprising: a memory storing computer-executable instructions; and at least one processor coupled with the memory and configured to execute the computer-executable instructions to perform a method as any of paragraphs Z-AU recite.

AX. A device of wireless communication, comprising means for performing a method as any of paragraphs Z-AU recite.

AY. A non-transitory computer-readable medium storing computer executable code, the code when executed by a processor causes the processor to perform a method as any of paragraphs Z-AU recite.

What is claimed is:

1. A method of wireless communication at a user equipment (UE), comprising:

transmitting, to another device, correlation capability information indicating a sounding reference signal (SRS) grouping capability of the UE, including an indication of a first SRS grouping of a reference antenna port and another antenna port and correlation information between the reference antenna port and the another antenna port;

receiving, from the another device, reference signal (RS) configuration information for configuring a sounding procedure to be performed by the UE;

transmitting, based on the RS configuration information, a reference signal to the another device over the reference antenna port of the UE to allow the another device to determine channel information for the another antenna port of the UE based on the reference signal and correlation capability information; and receiving data from the another device based on the channel information.

2. The method of claim 1, wherein transmitting the correlation capability information comprises transmitting the SRS grouping capability identifying a plurality of antenna groups, the SRS grouping capability identifying at least one of a number of available reference antenna ports in an individual antenna group of the plurality of antenna groups, an amount of the plurality of antenna groups, or an amount of antenna ports in an individual antenna group of the plurality of antenna groups.

3. The method of claim 1, wherein transmitting the correlation capability information comprises:

transmitting a SRS grouping capability identifier that identifies the correlation capability information and defines:

a first antenna group including the reference antenna port and the another antenna port, or a second antenna group including the reference antenna port and a third antenna group including the another antenna port.

4. The method of claim 1, wherein transmitting the correlation capability information comprises transmitting a plurality of SRS grouping capabilities including the SRS grouping capability, and wherein receiving the RS configuration information comprises receiving a selection of the SRS grouping capability.

5. The method of claim 1, wherein receiving the RS configuration information comprises receiving an identifier of the reference antenna port from the another device, the reference antenna port selected by the another device based on the correlation capability information.

6. The method of claim 1, wherein receiving the RS configuration information comprises receiving one or more antenna identifiers of one or more reference antenna ports from the another device, the one or more reference antenna ports selected by the another device based on an attribute of the another device and the one or more antenna identifiers including an identifier of the reference antenna port.

7. The method of claim 1, further comprising determining an amount of antenna ports to be used for physical downlink shared channel (PDSCH) precoding based on the RS configuration information.

8. The method of claim 1, wherein receiving the RS configuration information comprises receiving an indication of an amount of antenna ports to be used for physical downlink shared channel (PDSCH) precoding within radio resource control (RRC) signaling.

9. The method of claim 1, further comprising:

transmitting a correlation report to the another device, the correlation report including the correlation capability information defining a correlation between the reference antenna port and at least the another antenna port.

10. The method of claim 9, wherein transmitting the correlation report to the another device comprises transmitting, based on reporting configuration information received from the another device, the correlation report to the another device via a channel state information report.

11. The method of claim 9, wherein transmitting the correlation report to the another device comprises transmitting, based on reporting configuration information received from the another device, the correlation report to the another device via an uplink control information (UCI) message.

12. The method of claim 9, wherein transmitting the correlation report to the another device comprises transmitting the correlation report to the another device via a medium access control (MAC) protocol control element (CE) triggered by a network.

13. The method of claim 9, wherein the correlation capability information is first correlation capability information, the reference antenna port is a first antenna port, the another antenna port is a second antenna port, and transmitting the correlation report to the another device comprises transmitting a partial correlation report with the first correlation capability information and without second correlation capability information corresponding to a correlation between the first antenna port and a third antenna port of the UE that belongs to an antenna group different from the first antenna port and the second antenna port.

14. The method of claim 13, further comprising receiving reporting configuration information indicating an amount of the correlation capability information needed by the another device, and wherein transmitting the correlation report to the another device comprises transmitting the partial correlation report based on the reporting configuration information.

15. A user equipment (UE) for wireless communication, comprising:
   a memory storing computer-executable instructions; and
   at least one processor coupled with the memory and configured to:
      transmit, to another device, correlation capability information indicating a sounding reference signal (SRS) grouping capability of the UE, including an indication of a first SRS grouping of a reference antenna port and another antenna port and correlation information between the reference antenna port and the another antenna port;
      receive, from the another device, reference signal (RS) configuration information for configuring a sounding procedure to be performed by the UE;
      transmit, based on the RS configuration information, a reference signal to the another device over the reference antenna port of the UE to allow the another device to determine channel information for the another antenna port of the UE based on the reference signal and correlation capability information; and
      receive data from the another device based on the channel information.

16. A method of wireless communication at a device, comprising:
   receiving, from a user equipment (UE), correlation capability information indicating a sounding reference signal (SRS) grouping capability of the UE, including an indication of a first SRS grouping of a reference antenna port and another antenna port and correlation information between the reference antenna port and the another antenna port;
   determining reference signal (RS) configuration information for configuring a sounding procedure to be performed by the UE;
   transmitting the RS configuration information to the UE;
   measuring a reference signal received from the reference antenna port of the UE to determine measurement information, the reference signal transmitted based on the RS configuration information;
   determining channel information associated with the reference antenna port and the another antenna port of the UE based on the measurement information and correlation capability information; and
   transmitting data to the UE based on the channel information.

17. The method of claim 16, wherein the reference antenna port is a first antenna port, the another antenna port is a second antenna port, and determining channel information associated with the UE comprises determining channel state information corresponding to the first antenna port and the second antenna port of a first antenna grouping including and a third antenna port of a second antenna grouping.

18. The method of claim 16, further comprising determining the correlation capability information based on the SRS grouping capability.

19. The method of claim 16, wherein receiving the correlation capability information comprises receiving a plurality of SRS grouping capabilities, and further comprising:
   selecting the SRS grouping capability; and
   transmitting an identifier of the SRS grouping capability to the UE.

20. The method of claim 19, wherein selecting the SRS grouping capability comprises selecting the SRS grouping capability associated with a plurality of antenna groups having a uniform amount of antenna ports.

21. The method of claim 19, wherein selecting the antenna grouping comprises selecting the SRS grouping capability associated with a plurality of antenna groups having a non-uniform amount of antenna ports.

22. The method of claim 16, wherein determining the RS configuration information comprises determining the reference antenna port based on the SRS grouping capability.

23. The method of claim 16, wherein determining the RS configuration information comprises determining one or more reference antenna ports based on an attribute of the device.

24. The method of claim 16, wherein determining the RS configuration information comprises determining an amount of antenna ports to be used for physical downlink shared channel (PDSCH) precoding based on the SRS grouping capability.

25. The method of claim 16, wherein determining the RS configuration information comprises determining an amount of antenna ports to be used for physical downlink shared channel (PDSCH) precoding based on an attribute of the device, and transmitting the RS configuration information comprises transmitting the RS configuration via radio resource control (RRC) signaling.

26. The method of claim 16, further comprising receiving a correlation report from the UE, the correlation report including the correlation capability information defining a correlation between the reference antenna port and at least the another antenna port.

27. The method of claim 26, wherein receiving the correlation report comprises receiving the correlation report via a channel station information report.

28. The method of claim 26, wherein receiving the correlation report comprises receiving the correlation report via an uplink control information (UCI) message.

29. The method of claim 26, wherein receiving the correlation report comprises receiving the correlation report via a medium access control (MAC) protocol control element (CE) triggered by a network.

30. A device for wireless communication, comprising:
   a memory storing computer-executable instructions; and
   at least one processor coupled with the memory and configured to execute the computer-executable instructions to:
      receive, from a user equipment (UE), correlation capability information indicating a sounding reference signal (SRS) grouping capability of the UE, including an indication of a first SRS grouping of a reference antenna port and another antenna port and correlation information between the reference antenna port and the another antenna port;

determine reference signal (RS) configuration information for configuring a sounding procedure to be performed by the UE;

transmit the RS configuration information to the UE;

measure a reference signal received from the reference antenna port of the UE to determine measurement information, the reference signal transmitted based on the RS configuration information;

determine channel information associated with the reference antenna port and the another antenna port of the UE based on the measurement information and correlation capability information; and transmit data to the UE based on the channel information.

* * * * *